US011668063B2

(12) United States Patent
Horie et al.

(10) Patent No.: US 11,668,063 B2
(45) Date of Patent: Jun. 6, 2023

(54) STEEL PIPE COUPLING DEVICE FOR STEEL PIPES

(71) Applicants: ASAHI KASEI CONSTRUCTION MATERIALS CORPORATION, Tokyo (JP); WING CORPORATION, Saitama (JP)

(72) Inventors: Hiroyuki Horie, Saitama (JP); Yusuke Okamoto, Saitama (JP)

(73) Assignees: ASAHI KASEI CONSTRUCTION MATERIALS CORPORATION, Tokyo (JP); WING CORPORATION, Saitama (JP)

(*) Notice: Subject to any disclaimer, the term of this patent is extended or adjusted under 35 U.S.C. 154(b) by 1037 days.

(21) Appl. No.: 16/342,424

(22) PCT Filed: Oct. 13, 2017

(86) PCT No.: PCT/JP2017/037245
§ 371 (c)(1),
(2) Date: Apr. 16, 2019

(87) PCT Pub. No.: WO2018/074374
PCT Pub. Date: Apr. 26, 2018

(65) Prior Publication Data
US 2019/0249387 A1 Aug. 15, 2019

(30) Foreign Application Priority Data
Oct. 18, 2016 (JP) .............................. JP2016-204440

(51) Int. Cl.
*E02D 5/52* (2006.01)
*E02D 5/24* (2006.01)
(Continued)

(52) U.S. Cl.
CPC ............... *E02D 5/526* (2013.01); *E02D 5/24* (2013.01); *F16B 7/18* (2013.01); *F16L 21/02* (2013.01);
(Continued)

(58) Field of Classification Search
CPC ... E02D 5/24; E02D 5/526; E02D 2200/1685; E02D 2300/0029; F16L 21/02;
(Continued)

(56) References Cited

U.S. PATENT DOCUMENTS 3,606,393 A * 9/1971 Huntsinger ........... F16L 25/065
411/116
3,628,336 A * 12/1971 Moore .................. E02B 17/021
405/196
(Continued)

FOREIGN PATENT DOCUMENTS

| JP | 11-036285 | 2/1999 |
| JP | 11-36286 | 2/1999 |

(Continued)

OTHER PUBLICATIONS

International Preliminary Report on Patentability dated Apr. 23, 2019 in International (PCT) Patent Application No. PCT/JP2017/037245, with English Translation.
(Continued)

*Primary Examiner* — Amber R Anderson
*Assistant Examiner* — Stacy N Lawson
(74) *Attorney, Agent, or Firm* — Wenderoth, Lind & Ponack, L.L.P.

(57) ABSTRACT

A coupling device includes male and female couplings having first and second circumferential grooves on surfaces of the respective couplings that face each other when the couplings are fitted together. The coupling device further includes an engaging member. When the male coupling is (Continued)

pushed into the female coupling, the engaging member is retracted into the second groove, allowing the male coupling to be inserted into the female coupling, and when the couplings are fitted together, the engaging member is pushed into the first groove by coil springs so as to be fitted into both of the groove, thereby preventing separation of the male and female couplings in the axial direction. Countersunk head screws support respective divided pieces of the engaging member. Slotted head setscrews are screwed in at boundaries between the adjacent divided pieces to press the divided pieces against the bottom of the first groove.

12 Claims, 21 Drawing Sheets

(51) Int. Cl.
  *F16L 21/08* (2006.01)
  *F16B 7/18* (2006.01)
  *F16L 21/02* (2006.01)
(52) U.S. Cl.
  CPC ...... *F16L 21/08* (2013.01); *E02D 2200/1685* (2013.01); *E02D 2300/0029* (2013.01); *E02D 2600/20* (2013.01)

(58) Field of Classification Search
  CPC ......... F16L 21/08; F16L 25/06; F16L 25/065; F16L 37/086; F16B 7/18
  See application file for complete search history.

(56) References Cited

U.S. PATENT DOCUMENTS

| | | | | |
|---|---|---|---|---|
| 3,844,127 A | * | 10/1974 | Koop, Jr. | E02B 17/06 285/308 |
| 4,068,865 A | * | 1/1978 | Shanks, II | F16L 25/065 285/356 |
| 4,094,539 A | * | 6/1978 | Reimert | F16L 25/065 285/309 |

FOREIGN PATENT DOCUMENTS

| | | |
|---|---|---|
| JP | 2000-265459 | 9/2000 |
| JP | 2000-282460 | 10/2000 |
| JP | 2000-319874 | 11/2000 |
| JP | 2001-182052 | 7/2001 |
| JP | 2001-200534 | 7/2001 |
| JP | 2001-241038 | 9/2001 |
| JP | 2001-303556 | 10/2001 |
| JP | 2001-311143 | 11/2001 |
| JP | 2001-311144 | 11/2001 |
| JP | 2001-311145 | 11/2001 |
| JP | 2001-329532 | 11/2001 |
| JP | 2004-293231 | 10/2004 |
| JP | 2005-3029 | 1/2005 |
| JP | 2005-48583 | 2/2005 |
| JP | 2005-054442 | 3/2005 |
| JP | 2011-162963 | 8/2011 |
| JP | 2012-132306 | 7/2012 |
| JP | 2013-040537 | 2/2013 |
| JP | 1463516 | 3/2013 |
| JP | 2014-074468 | 4/2014 |

OTHER PUBLICATIONS

International Search Report Issued PCT/JP2017/037245 in International (PCT) Patent Application No. PCT/JP2017/037245, with English Translation.

* cited by examiner

STEEL PIPE COUPLING DEVICE FOR STEEL PIPES

TECHNICAL FIELD

The present invention relates to a steel pipe coupling device for steel pipes such as piles used for piling.

BACKGROUND ART

When pressing, while rotating, piles comprising steel pipes 1a and 1b into ground as shown in FIG. 16, it is necessary to stop the driving and connect the steel pipes 1a and 1b together in order to drive the piles to a predetermined depth. For example, the steel pipes are connected together by welding. However, welding steel pipes together at a construction site requires skilled hands, and can be influenced by weather conditions. Thus, steel pipe coupling devices (as disclosed in the below-identified Patent Documents 1-4) are proposed which allow steel pipes to be connected together at a construction site without welding.

Such a steel pipe coupling device typically comprises a pair of male and female tubular couplings 10 and 20. At a factory, the male coupling is coaxially welded to an end of one of two steel pipes to be connected together, and the female coupling is coaxially welded to an end of the other of the steel pipes 1a and 1b. Then, at a construction site, the male and female couplings are joined together to connect the two steel pipes 1a and 1b together.

Some of such steel pipe coupling devices are configured such that the male and female couplings are joined together by splines and further fastened together by bolts. In some prior art arrangements (such as disclosed in Patent Documents 1 and 2), circumferential grooves are formed in surfaces of the male and female couplings that are to be opposed to each other when the male and female couplings are fitted together, and with the male and female couplings fitted together, a stopper is fitted into both of the circumferential grooves, and fasted in position by bolts. In some arrangements (such as disclosed in claim 1 and the drawings of Patent Document 2), the stopper is a radially compressible and expandable ring, and the ring is radially compressed and expanded by screwing bolts to fit the ring into both circumferential grooves or move the ring out of one of the circumferential grooves.

There is also known a steel pipe coupling device disclosed in Patent Document 3 (see Reference FIGS. 1 and 2, which illustrate the state of use), in which, with the male and female couplings fitted together and meshing with each other in the vertical direction, locking pins are screwed into the male and female couplings so as to extend across the opposed surfaces of the male and female couplings.

Also known is a steel pipe coupling device disclosed in Patent Document 4 (see Abstract and FIGS. 1-4), in which, with the male and female couplings fitted together and meshing with each other in the vertical direction, a coupling member is placed on the outer peripheries of the portions of the male and female couplings that mesh with each other, and the coupling member is fastened by bolts.

PRIOR ART DOCUMENTS

Patent Documents

Patent Document 1: JP2001-241038A
Patent Document 2: JP H11-36286A
Patent Document 3: JP Design Registration 1463516
Patent Document 4: JP2013-40537A
Patent Document 5: JP2014-74468A

SUMMARY OF THE INVENTION

Object of the Invention

While the above-described steel pipe coupling devices are all useful to some extent, in arrangements in which the male and female couplings are fastened together by screwing, the strength by which the couplings are fastened together is influenced by the degree of screwing, so that skilled hands are required to achieve the proper strength. Also, if there is anything on the outer surface of the coupling device that protrudes beyond the outer peripheral surfaces of the steel pipes, it will increase the resistance when pressing the steel pipes into ground. For example, the coupling member of Patent Document 4 could be such a resistance.

Driving piles in a station platform F as shown in FIG. 16 is difficult, because a roof R may restrict the above ground height of the pile structure; it is troublesome to carry out soil produced by digging a pit P around the piles 1a and 1b, and fill the pit P later; and the whole piling work has to be finished during the period after the last train has left and before the first train arrives. It is therefore necessary to dig as small a pit P as possible. However, it is very difficult to turn e.g., bolts in a small pit P. It is therefore desired to connect the piles 1a and 1b together more easily in a small pit P.

An object of the present invention is to provide a steel pipe coupling device of which the male and female couplings can be connected together in a single action.

Means for Achieving the Object

In order to achieve this object, the steel pipe coupling device includes an engaging member disposed between the opposed surfaces of the male and female couplings when they are fitted together such that, when the male coupling is inserted into the female coupling, the engaging member moves away from the path of the male coupling, allowing the male and female couplings to be fitted together, and such that, when the male and female couplings are fitted together, the engaging member can be easily moved between the male and female couplings to prevent the male and female couplings from being separated from each other in the axial direction.

With this arrangement, since the engaging member allows insertion of the male coupling into the female coupling, and also prevents separation of the male and female couplings, steel pipes can be connected together practically in a single action.

More specifically, the present invention provides a steel pipe coupling device for connecting opposed ends of two steel pipes to each other, the steel pipe coupling device comprising: a male coupling and a female coupling which are tubular in shape and configured to be welded to the respective steel pipes, the male and female couplings being further configured to be fitted to and mesh with each other in the direction of a common axis of the male and female couplings so as to be integrally rotatable about the common axis; wherein the male and female couplings have, respectively, circumferential grooves in peripheral surfaces thereof configured to be opposed to each other when the male and female couplings are fitted together such that the circumferential grooves are radially opposed to each other when the male and female couplings are fitted together; an engaging member configured to be fitted in both of the circumferential grooves so as to be movable radially of the male and female couplings when the circumferential grooves are radially opposed to each other; wherein the male and female couplings are configured to be fitted to and mesh with each other with the female coupling located outside the male coupling, and the female coupling has through holes extending from an outer surface of the female coupling to the circumferential groove of the female coupling; push sticks each movably inserted through a respective one of the through holes and having a distal end thereof fixed to the engaging member; wherein the steel pipe coupling device is configured such that the male coupling can be inserted into the female coupling by pulling out the push sticks until the engaging member is retracted into the circumferential groove of the female coupling, and such that, when the male and female couplings are fitted together, the male and female couplings can be coupled together so as to be inseparable in the direction of the common axis by pushing in the push sticks until the engaging member is fitted into both of the circumferential grooves of the male and female couplings, and until heads of the push sticks are completely retracted into the respective through holes.

In this configuration, the limitation, "push sticks each movably inserted through a respective one of the through holes" means that the push sticks are movable through the respective through holes by pushing or pulling the push sticks in the axial directions of the push sticks. By pulling the push sticks until the engaging member is retracted into the circumferential groove of the outer (i.e., female) coupling, and then, by inserting the male coupling into the female coupling until the male and female couplings mesh with each other, the male and female couplings are coupled together such that the steel pipes are coupled together so as to be rotatable about the common axis of the steel pipes. Then, by pushing in the push sticks until the engaging member is fitted into both of the circumferential grooves of the male and female couplings, the steel pipes are prevented from being separated from each other in the vertical direction.

Preferably, at least one of the abutment edges of the male coupling and the engaging member is chamfered so that, as the male coupling is inserted into the female coupling, the engaging member is pushed by the leading end of the male coupling such that the engaging member can be smoothly retracted into the circumferential groove of the female coupling. By visually confirming that push sticks are completely retracted into the respective through holes, it is possible to confirm that the male and female couplings are rigidly coupled together in the vertical direction. If there is any push stick or sticks that are not completely retracted into the through holes, they can be completely sunk into the through holes by striking their heads with e.g., a hammer to make sure that the male and female couplings are coupled together in the vertical direction by the engaging member.

The distal ends of the push sticks may be fixed to the engaging member by screwing, welding, adhesive bonding, or other means. A known tool such as a hammer or a prier can be used to pull and push the push sticks. By providing the heads of the push sticks with engaged portions which an extraction tool can hook, the push sticks can be pulled by hooking an extraction tool on the engaged portions until the engaging member is retracted into the circumferential groove of the female coupling so that the male coupling can be separated from the female coupling, and thus the upper and lower steel pipes can be separated from each other.

Since the engaging member can be moved in the circumferential groove of the female coupling by pulling and pushing the push sticks, the steel pipe coupling device according to the present invention allows steel pipes to be connected together easily even in a small pit P.

This coupling device may further include springs disposed between an outer surface of the engaging member and a deeper inner surface of the circumferential groove of the female coupling, and configured to press the engaging member toward the male coupling. With this arrangement, the male coupling can be inserted into the female coupling by pulling out the push sticks against the force of the springs until the engaging member is retracted into the circumferential groove of the female coupling, and when the male and female couplings are fitted together, the engaging member is pushed into the other circumferential groove so as to be fitted in both of the circumferential grooves under the biasing force of the springs, thereby preventing the male and female couplings from separating from each other in the axial direction.

The engaging member may be divided into any number of engaging pieces, provided such divided engaging pieces can fixedly couple the male and female couplings together in the vertical direction. The divided engaging pieces are preferably arranged at equal intervals. The circumferential grooves may have circular, oval, rectangular, or any other cross-sectional shapes, but have preferably the same sectional shapes when taken along any radial plane, and extend to their bottoms so that the engaging member is smoothly movable in the circumferential grooves. Needless to say, if the engaging member is divided into a plurality of engaging pieces, springs and push sticks are provided for each divided engaging pieces.

By configuring the engaging member so as to extend around the entire circumference of the male and female couplings, the male and female couplings are prevented from being separated from each other in the axial direction around the entire circumference thereof, so that the male and female couplings can be more rigidly coupled together. By dividing the engaging member into engaging pieces, such divided engaging pieces can be easily fitted into the grooves.

By screwing screws into the female coupling from an outer surface of the female coupling to press ends of the divided engaging pieces that define boundaries between the adjacent divided engaging pieces so as to press the divided engaging pieces against an inner surface of the circumferential groove of the male coupling, the divided engaging pieces are more stably held in position in the grooves, so that the male and female couplings can be more rigidly coupled together.

The engaging member may comprise a ring having an opposed pair of circumferential ends. This ring is fitted in the circumferential groove of the female coupling, and can be radially compressed by its own elastic force.

This type of ring is known as a locking ring for a pipe coupling (see, for example, FIG. 2 of the above-identified Patent Document 5). This ring is fitted in the circumferential groove of the female coupling, and configured such that, as the male coupling is pushed into the female coupling, the ring is radially expanded and completely retracted into the circumferential groove of the female coupling, allowing the male coupling to be inserted into the female coupling, and as the male coupling is further pushed into the female coupling, the ring is radially compressed by its own elastic force until the ring fits into both grooves.

Advantages of the Invention

The present invention provides an advantage in that steel pipes can be easily coupled together.

EMBODIMENTS

Figure 1:
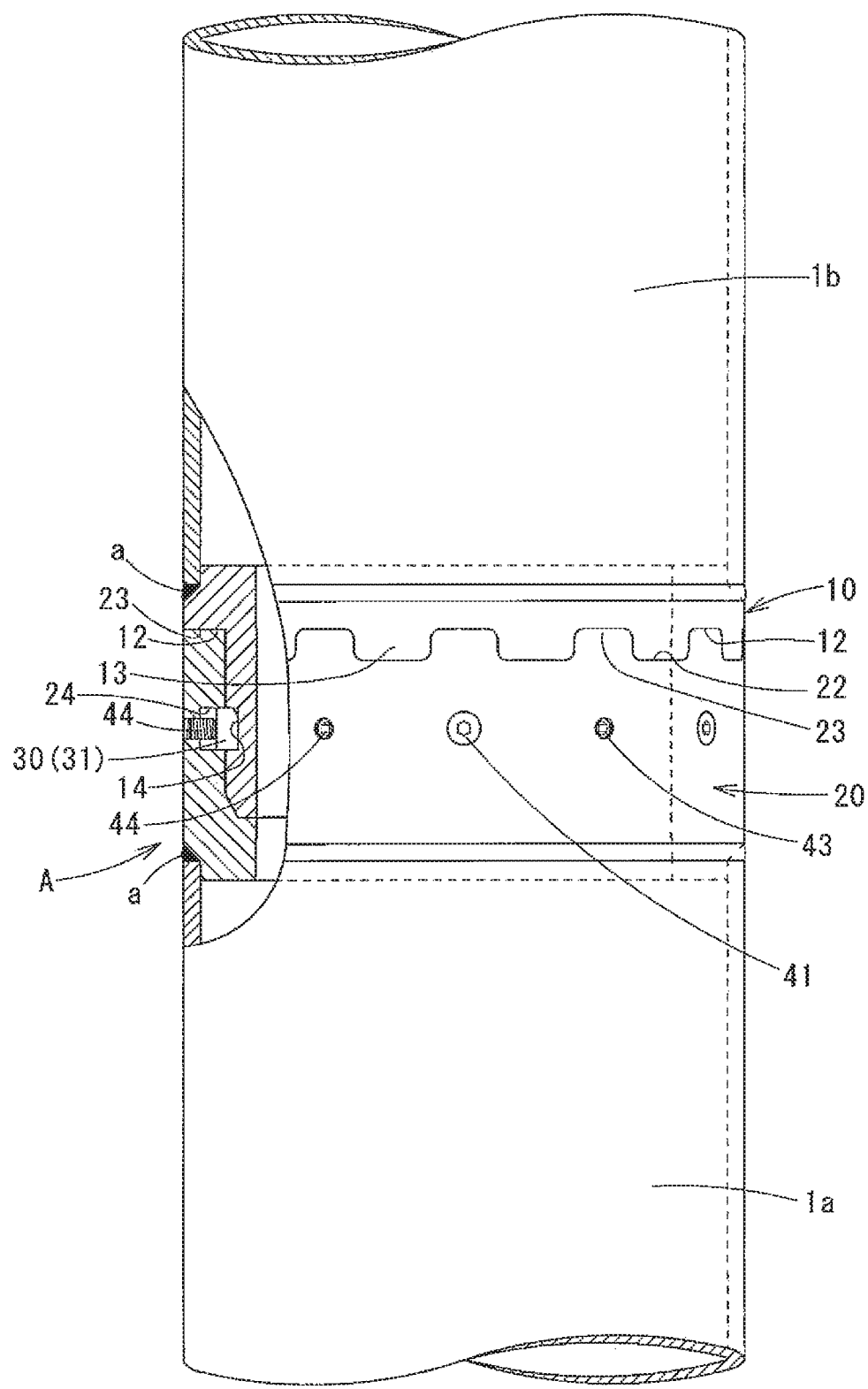
FIG. 1 is a partially cutaway front view of a steel pipe coupling device embodying the present invention, showing a state in which steel pipes are coupled together by the coupling device.

FIGS. 1-9 show a steel pipe coupling device A according to one embodiment of the present invention, which comprises a male coupling 10 and a female coupling 20. Two steel pipes 1 (which are sometimes individually indicated by "1a" and "1b") to be connected together are steel pipes (STK) made of carbon steel for general structure (JIS G 3444) or steel pipe piles (SKK) specified under JIS A 5525. The couplings 10 and 20 are made of a material that can be welded to the steel pipes 1. The steel pipe piles ordinarily have an outer diameter of 165.2 mm or more. The fitting length of the male and female couplings 10 and 20 may be determined to a suitable value taking the coupling strength into consideration, and may be, for example, about 90 mm if the coupling outer diameter is 270 mm.

As shown in FIGS. 3 and 6A-6D, the male coupling 10 has its upper edge portion 11 cut out along the entire circumference such that the outer peripheral surface of the upper edge portion 11 has a diameter substantially equal to the inner diameters of the steel pipes 1. The male coupling 10 is fixedly joined to one of the steel pipes, e.g., the steel pipe 1b, by fitting the upper edge portion 11 into one end of the steel pipe 1b, and by welding a (see FIG. 1) such that the outer peripheral surface of the steel pipe 1b and the outer peripheral surface of the male coupling 10 are flush with each other, and substantially nothing protrudes from the connecting portion therebetween.

Figure 8A:
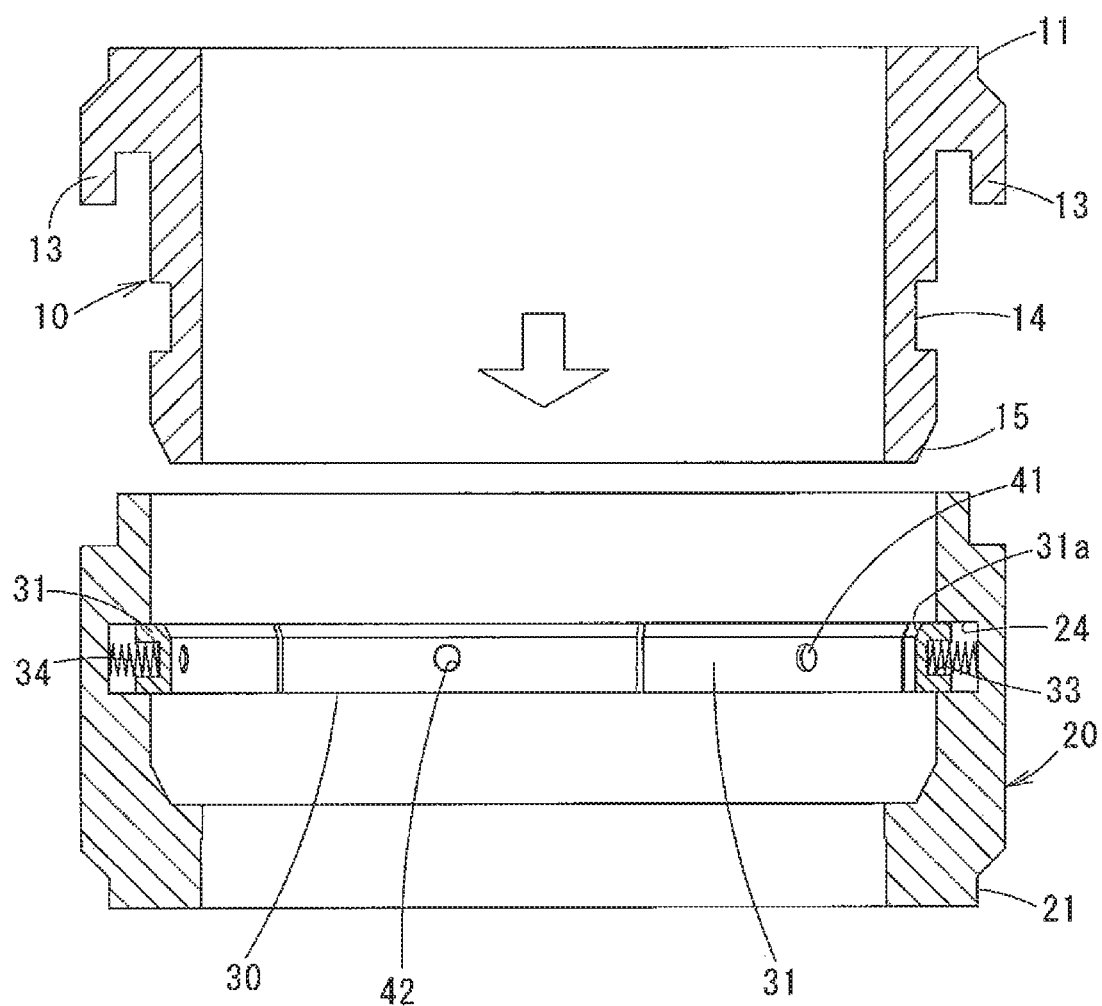
FIGS. 8A, 8B and 8C are sectional views of the embodiment of FIG. 1, illustrating how it operates.
Figure 8B:
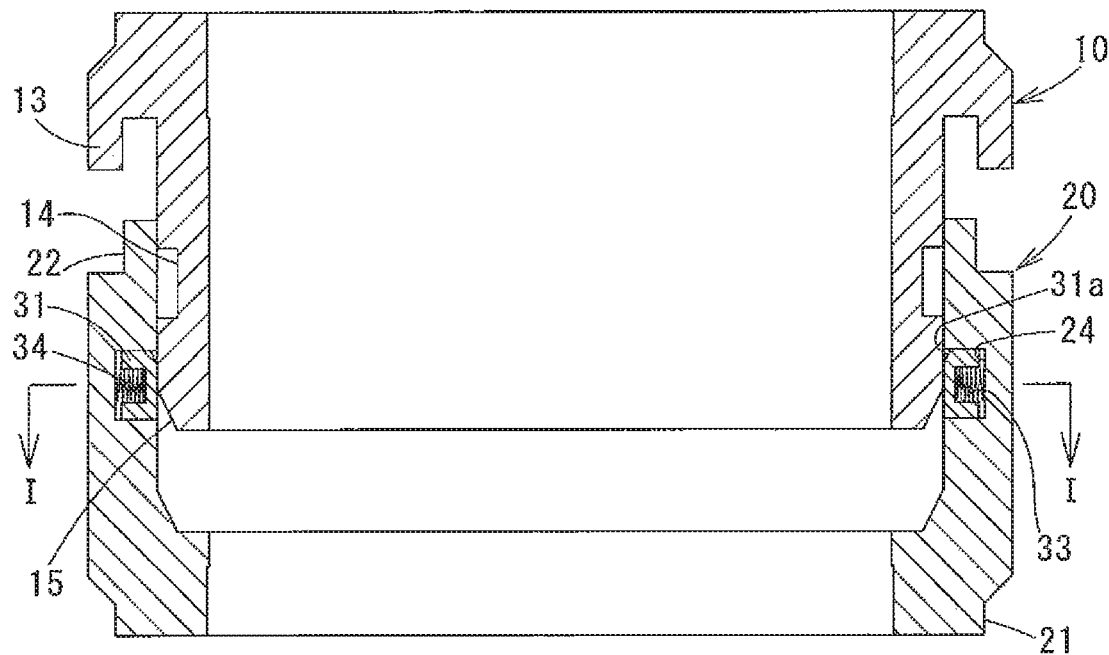

The portion of the male coupling 10 connecting to the lower end of the upper edge portion 11 has an outer peripheral surface formed with recesses 12 having bottom openings and arranged at equal intervals in the circumferential direction to define protrusions (teeth) 13 between the respective adjacent recesses 12 such that hollow spaces form behind the respective protrusions 13 (see FIG. 8A). The number of the recesses 12 (protrusions 13) is not limited, and the recesses 12 (protrusions 13) may not be arranged at equal intervals, provided the engagement force between the couplings 10 and 20 is sufficient to transmit rotational force between the steel pipes 1 once the steel pipes 1 are coupled together. Only one of the fitting portions may have a chamfer or chamfers.

The male coupling 10 is further formed with a (circumferential) groove 14 having a rectangular cross section and extending around the entire circumference substantially in the middle of the outer periphery of the portion of the male coupling 10 below the recesses 12 and the protrusions 13. The lower edge portion 15 of the male coupling 10, which is located further below the groove 14, has a flat chamfer around the entire circumference thereof. The position of the groove 14 in the axial direction of the (tubular) male coupling 10 is determined by e.g., experiments while taking the coupling strength into consideration.

Referring to FIGS. 3 and 7A-7E, the female coupling 20 has, at its upper portion, recesses 22 arranged at equal intervals around the entire circumference and having openings at the upper ends thereof, to define protrusions 23 between the respective adjacent recesses 22. The number, intervals, sizes, and depths of the recesses 22 and the protrusions 23 correspond to those of the protrusions 13 and the recesses 12, respectively, such that, with the protrusions 13 of the male coupling 10 fit into the respective recesses 22 of the female coupling 20, and the protrusions 23 of the female coupling 20 fit into the respective recesses 12 of the male coupling 10, the couplings 10 and 20 mesh with each other so as to be integrally rotatable about the axis (see FIG. 2A) With the male and female couplings 10 and 20 fitted and meshing in this manner, the outer peripheries of the couplings 10 and 20 are flush with each other, and substantially nothing protrudes therefrom.

The lower edge portion 21 of the female coupling 20 are cut out along the entire circumference thereof such that the outer peripheral surface of the lower edge portion 21 is substantially equal to the inner diameters of the steel pipes 1. The female coupling 20 is fixedly joined to one of the steel pipes, e.g., the steel pipe 1a, by fitting the lower edge portion 21 into one end of the steel pipe 1b, and by welding a (see FIG. 1) such that, as with the male coupling 10, the outer peripheral surface of the steel pipe 1a and the outer peripheral surface of the female coupling 20 are flush with each other, and substantially nothing protrudes from the connecting portion therebetween.

Figure 2A:
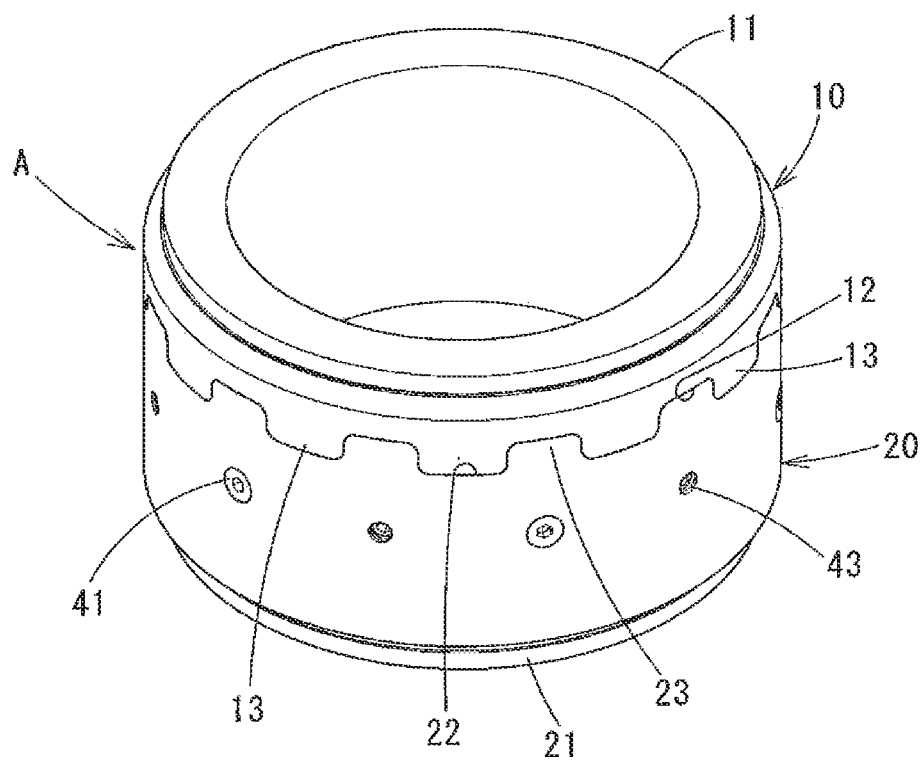
FIG. 2A is a perspective view of the embodiment of FIG. 1.

The female coupling 20 has a (circumferential) groove 24 having a rectangular cross section and extending around the entire circumference substantially axially in the middle of the inner surface of the female coupling 20 such that, when the male coupling 10 is fitted into the female coupling 20 and the couplings 10 and 20 are fixed together, the groove 24 and the groove 14 of the male coupling 10 are opposed to each other, defining a stepless groove (as shown in FIGS. 1, 2A and SC). The position of the groove 24 in the axial direction of the (tubular) female coupling 20 is determined by e.g., experiments while taking the coupling strength into consideration.

The steel pipe coupling device further includes a joint (locking ring) 30, as an engaging member, having a rectangular cross section and engageable in the groove 24 of the female coupling 20 and the groove 14 of the male coupling 10.

Figure 4:
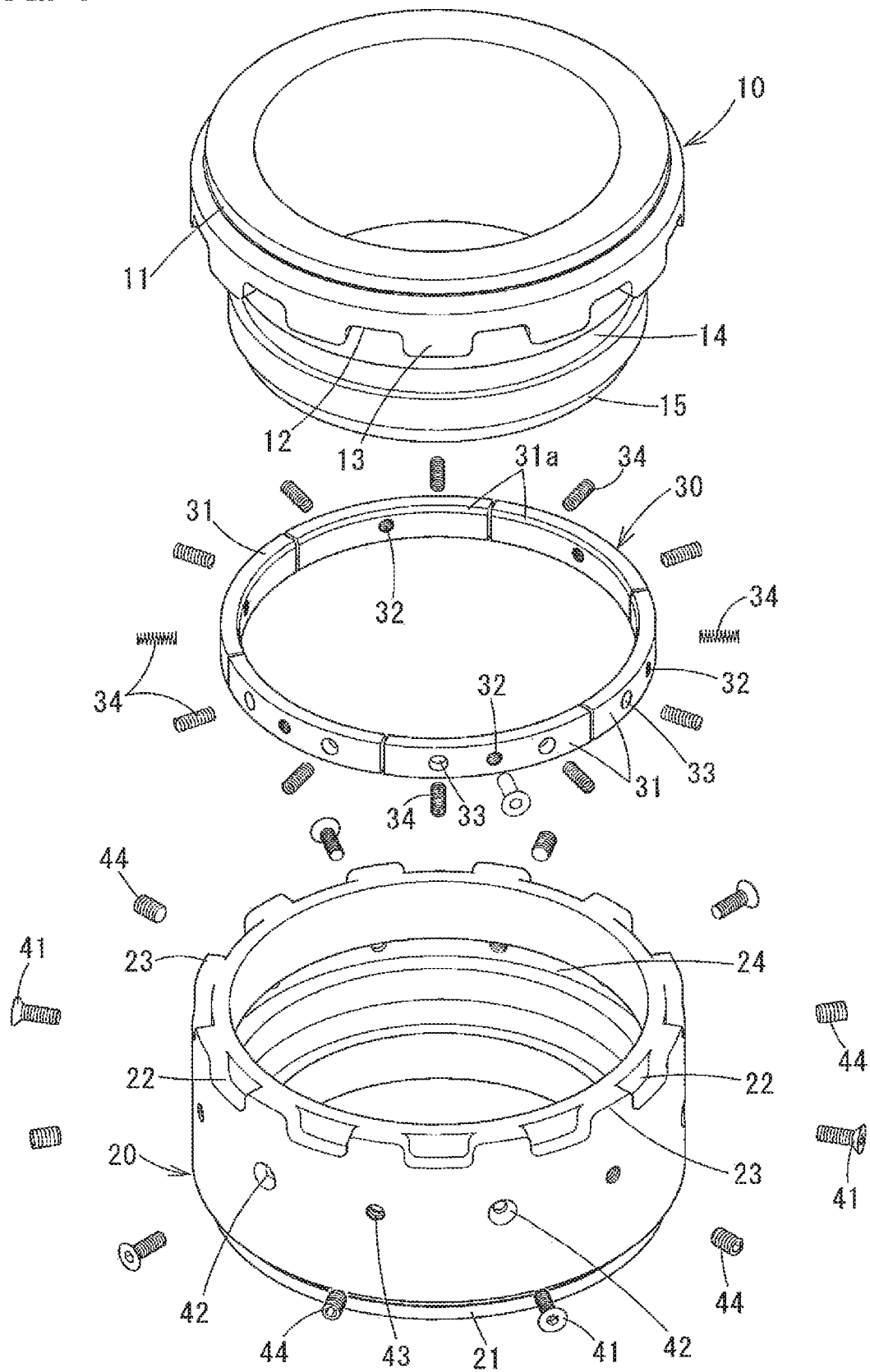
FIG. 4 is an exploded perspective view of the embodiment of FIG. 1.

The joint 30 is a circular annular member comprising divided (engaging) pieces 31 formed by dividing a steel ring having a diameter equal to the bottom diameter of the groove 14 of the male coupling 10 (see FIG. 4). Thus, when the divided pieces 31 are pushed radially inwardly by e.g., springs, the divided pieces 31 push each other in the circumferential direction, thus maintaining the circular annular shape. The number of the divided pieces 31 is not limited, and the divided pieces 31 are preferably arranged at equal intervals.

As shown in FIG. 4, each divided piece 31 has a flat chamfer 31a along its inner upper edge, and is formed with a threaded hole 32 substantially in the middle thereof in its length (arc) direction. Countersunk head screws 41 as push sticks are inserted through respective through holes 42 from the outer surface of the female coupling 20, and screwed into the threaded holes 32 of the respective divided pieces 31. The divided pieces 31 are thus supported by the female coupling 20 by being hung from the countersunk head screws 41.

Each divided piece 31 is further formed with holes 33 that are not open to the inner surface of the divided piece, on both sides of the threaded hole 32 at equal distances from the threaded hole 32. Coil springs 34 are fitted in the respective holes 33. When the divided pieces 31 are fitted into the groove 24 with the coil springs 34 fitted in the holes 33, and the divided pieces 31 are pulled toward the outside of the female coupling 20 by the countersunk head screws 41, the divided pieces 31 can be sunk into the groove 24 against the force of the coil springs 34 until the inner surfaces of the divided pieces 31 become substantially flush with, or are retracted from, the inner peripheral surface of the female coupling 20. Instead of the coil springs 34, circular arc-shaped leaf springs capable of pressing the divided pieces 31 may be used. If leaf springs are used, recesses are formed in the surfaces of the divided pieces 31 to receive the leaf springs. The leaf springs may be single-leaf springs, or may each comprise a pair of circular arc-shaped spring plates arranged such that their concave sides face each other. Holes for receiving the coil springs 34 or leaf spring may be formed in the (closed) bottom of the groove 24 for stable positioning of the springs.

Threaded holes 43 are formed in portions of the female coupling 20 corresponding to the boundaries between the adjacent divided pieces 31 so as to extend from the outer peripheral surface of the female coupling 20 to the groove 24. Screws such as slotted head setscrews 44 are screwed into the threaded holes 43 to press the opposed ends of the adjacent divided pieces.

At a factory, the male coupling 10 of the steel pipe coupling device A of this embodiment is fixed to one end (such as the lower end) of the steel pipe 1b by welding a, while the female coupling 20 is fixed to one end (such as the upper end) of the steel pipe 1a by welding a. A digger including an auger or a drill bit is mounted to the leading end of the steel pile at the leading end of the pile structure. A pile driver is fitted to the female coupling 20 to apply rotational force and the digging force to the steel pipes 1.

Figure 5:
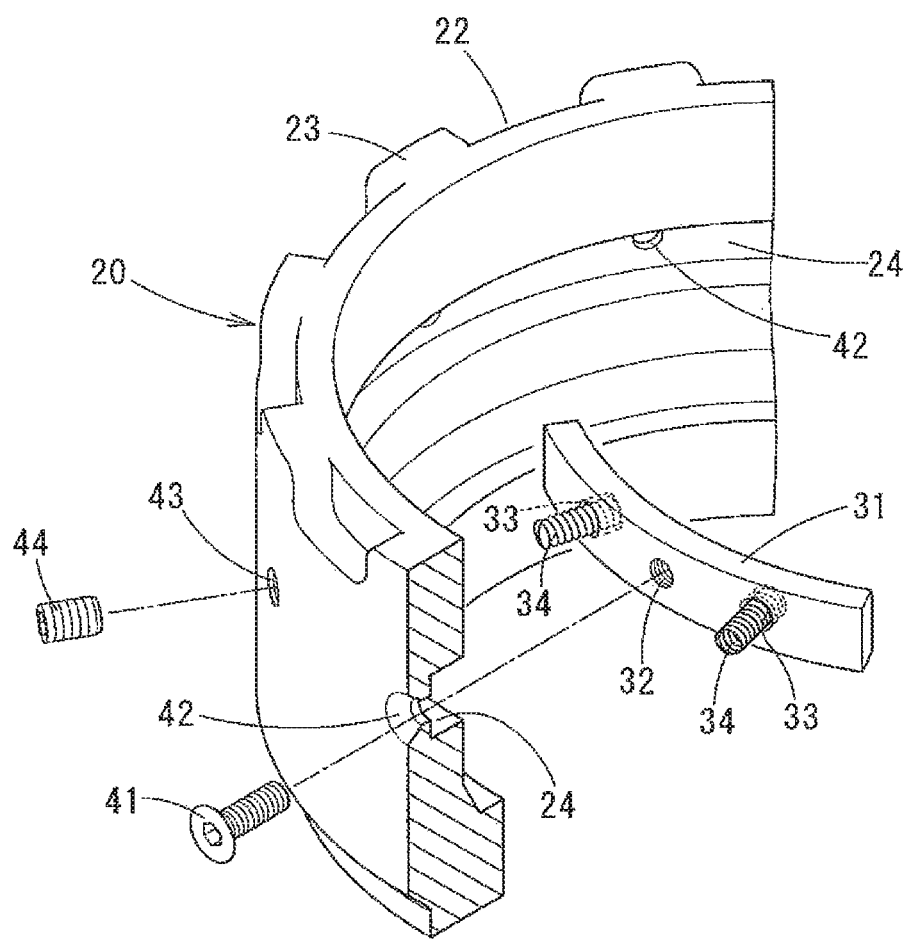
FIG. 5 is a partial exploded perspective view of the embodiment of FIG. 1, illustrating how an engaging member is mounted to the female coupling.
Figure 6A:
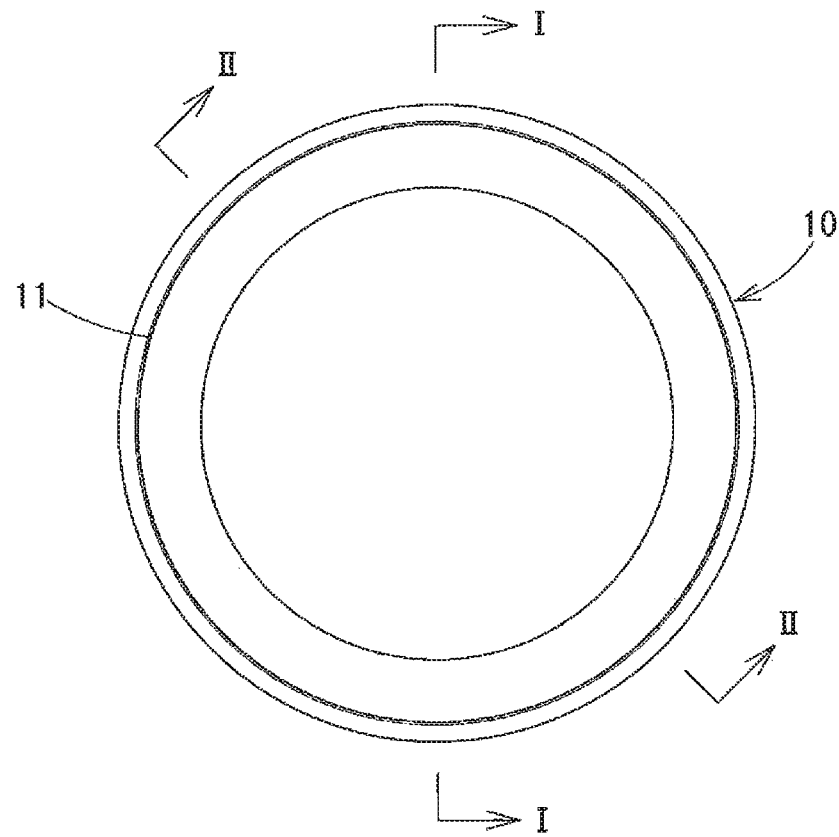
FIG. 6A is a top plan view of the male coupling of the embodiment of FIG. 1.
Figure 6B:
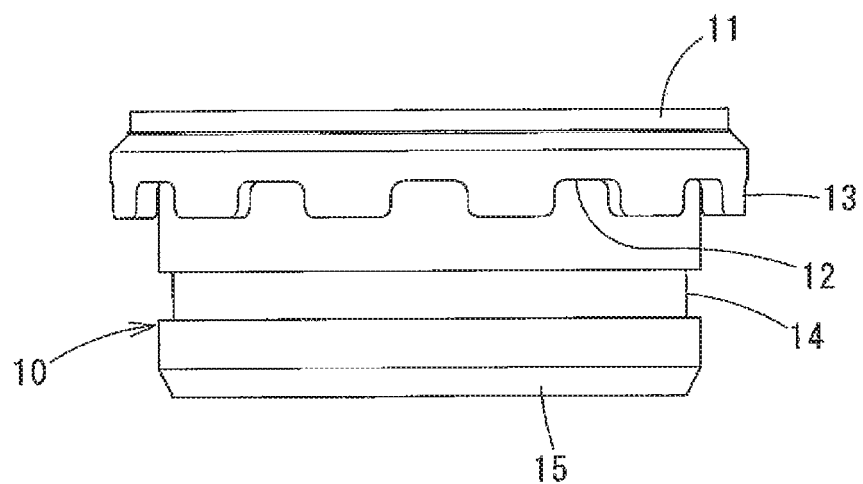
FIG. 6B is a front view of the male coupling.
Figure 6C:
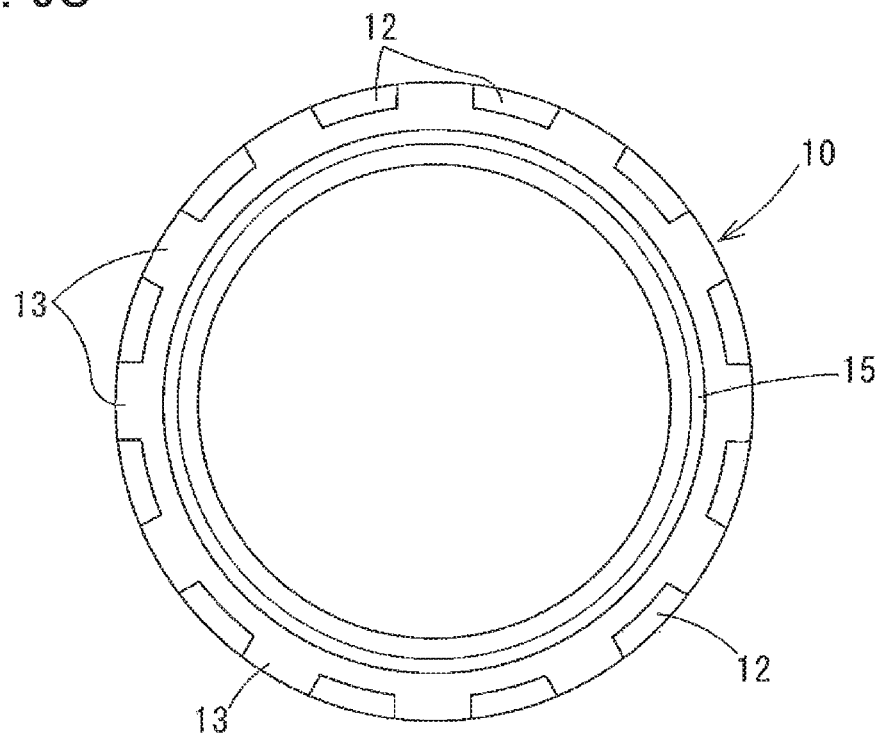
FIG. 6C is a bottom plan view of the male coupling.
Figure 6D:
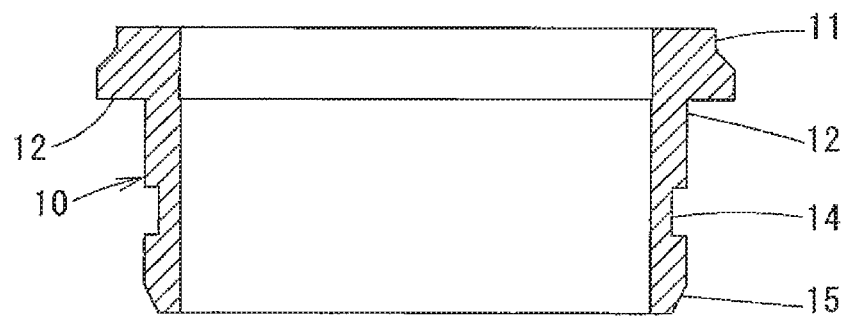
FIGS. 6D(a) and 6D(b) are sectional views of the male coupling, taken, respectively, along line I-I and line II-II of FIG. 6A.
Figure 6D:
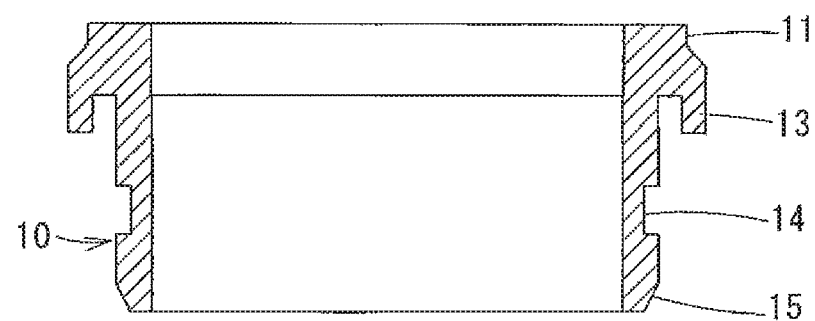
Figure 7A:
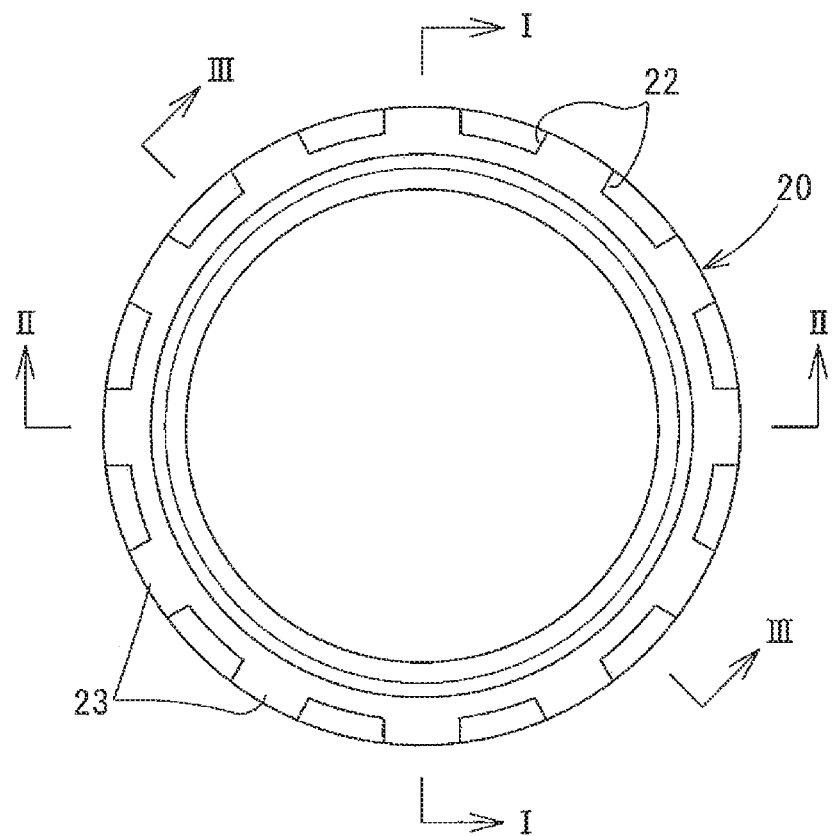
FIG. 7A is a top plan view of the female coupling of the embodiment of FIG. 1.
Figure 7B:
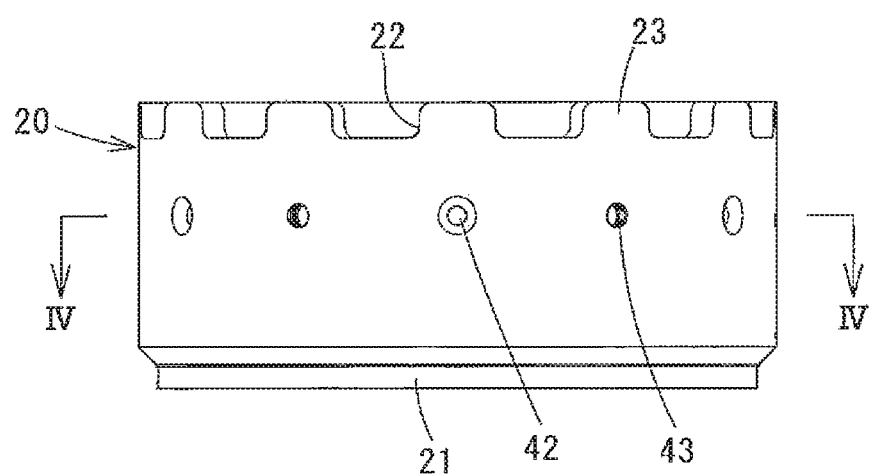
FIG. 7B is a front view of the female coupling.
Figure 7C:
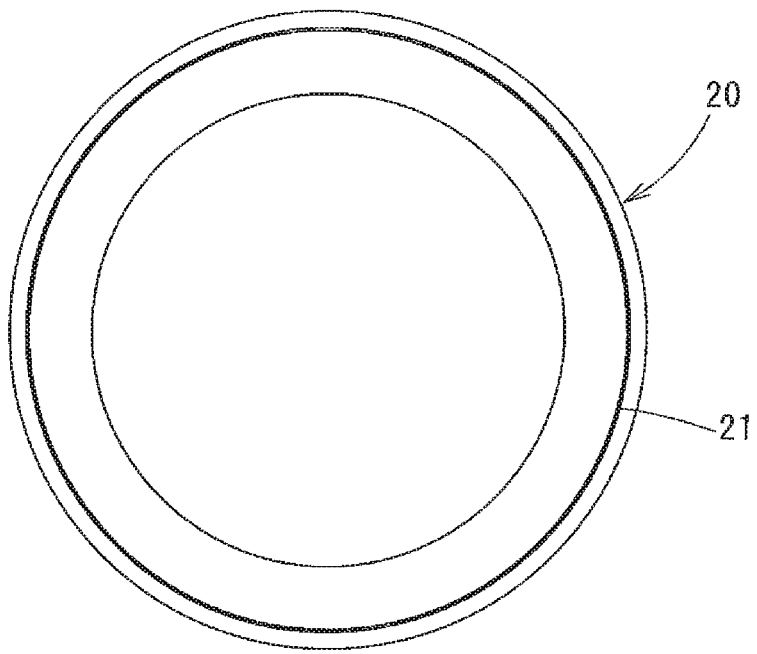
FIG. 7C is a bottom plan view plan view of the female coupling.
Figure 7D:
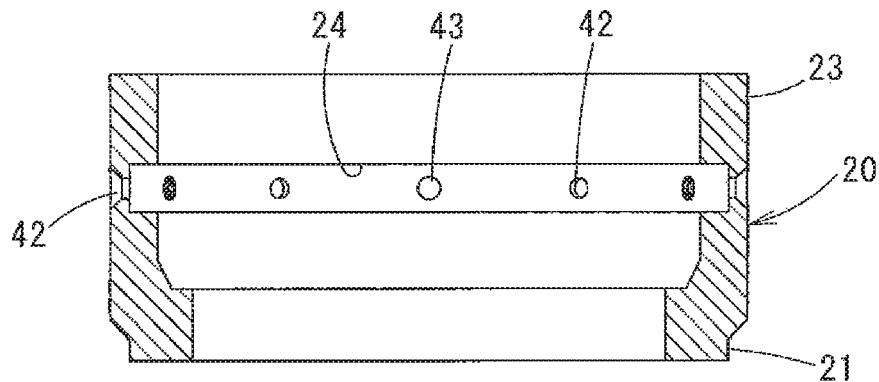
FIGS. 7D(a), 7D(b) and 7D(c) are sectional views of the female coupling, taken, respectively, along line I-I, line II-II, and line III-III of FIG. 7A.
Figure 7D:
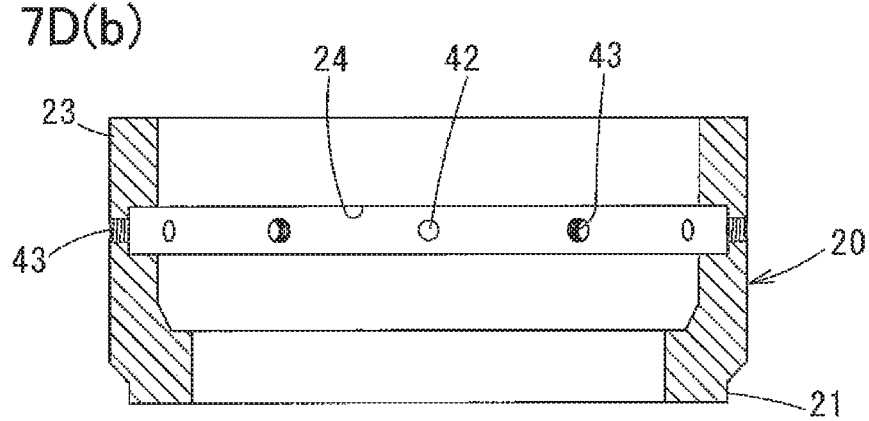
Figure 7D:
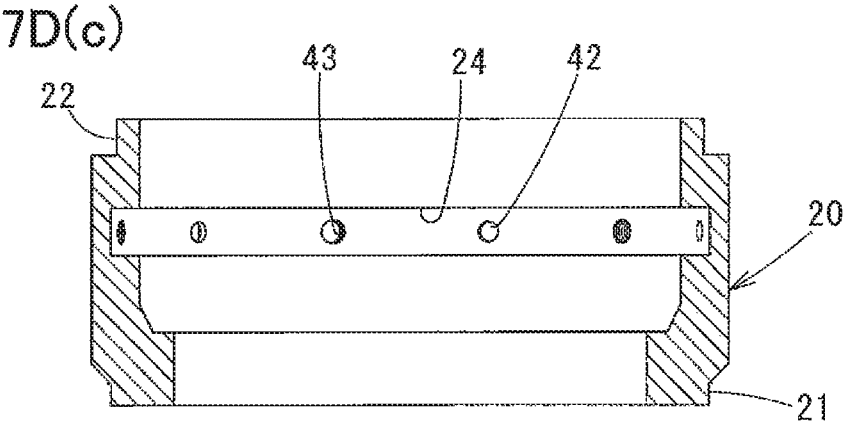
Figure 7E:
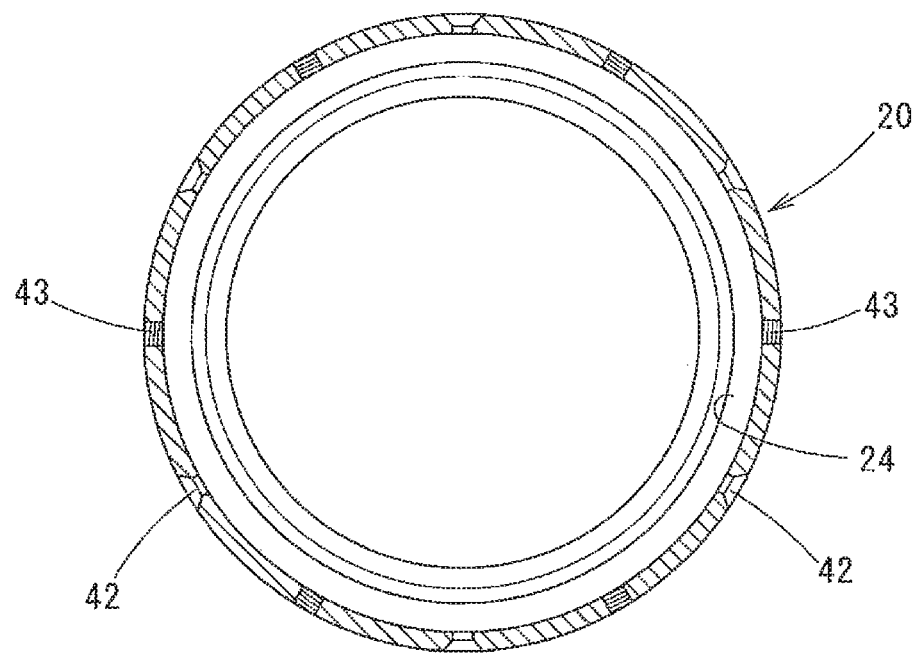
FIG. 7E is a sectional view of the female coupling, taken along line IV-IV of FIG. 7B.

As shown in FIG. 5, the divided pieces 31 are fitted into the groove 24 of the female coupling 20 with the coil springs 34 received in the respective holes 33 of the divided pieces 31, and the countersunk head screws 41 are inserted through the holes 42 and screwed into and fastened to the threaded holes 32 of the divided pieces 31 such that the joint (engaging member) 30 is fitted around the entire circumference of the groove 24, that is, the engaging pieces 31 are supported around the entire circumference of the groove 24. With the joint 30 (divided pieces 31) supported in this manner, the divided pieces 31 can be sunk into the groove 24 against the force of the coil springs 34.

In order to connect, to the steel pipe 1a that has been driven into ground, the next steel pipe 1b, the male coupling 10, which is fixed to the steel pipe 1b on the trailing side, has to be completely fitted into the female coupling 20, which is fixed to the steel pipe 1a. This is possible according to the present invention because, as the male coupling 10 is pushed into the female coupling 20, the joint 30 (i.e., the divided pieces 31) is retracted from the state shown in FIG. 8A to the state of FIG. 8B. As the male coupling 10 is pushed into the female coupling 20, the divided pieces 31 are smoothly retracted into the circumferential groove 24 due to the guiding effect of the flat chamfer 15 at the lower end of the male coupling and the flat chamfers 31a at the inner upper edges of the divided pieces 31. Either of the flat chamfer 15 at the lower end of the male coupling 10 and the flat chamfers 31a at the inner upper edges of the divided pieces 31 may be omitted.

Figure 8C:
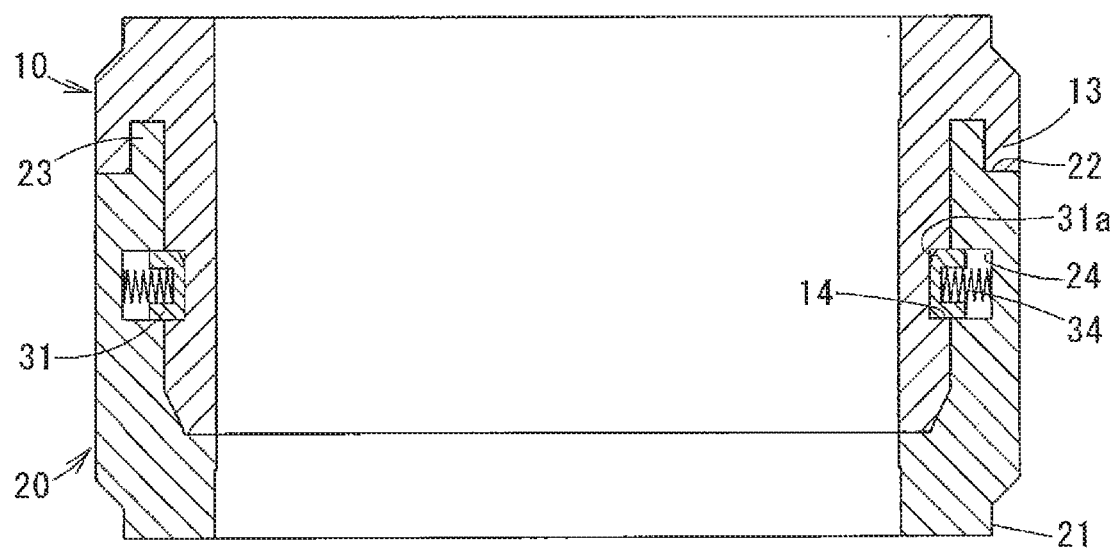
Figure 9:
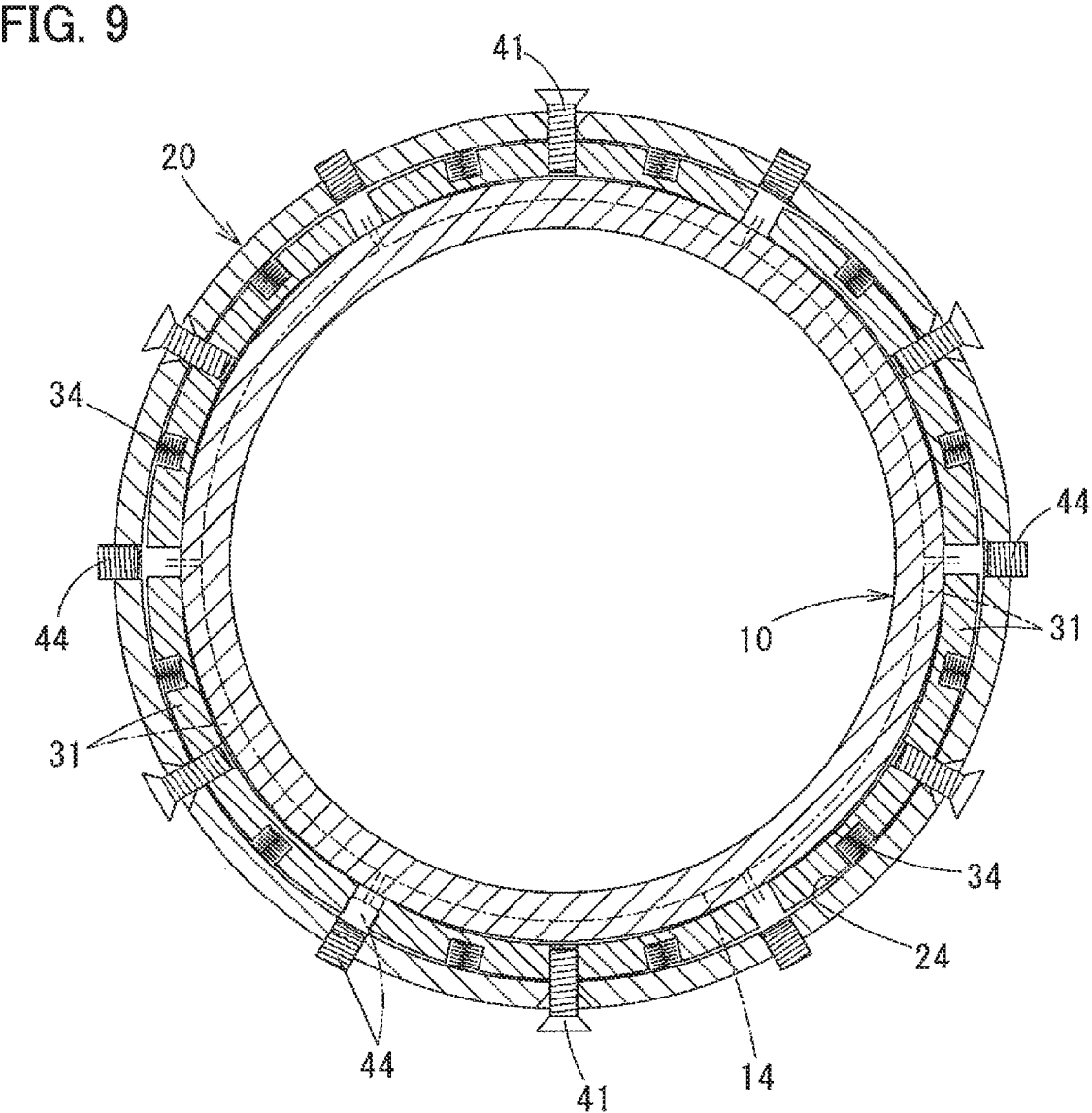
FIG. 9 is a sectional view taken along line I-I of FIG. 8B.

When the male coupling 10 is further pushed into the female coupling 20 until the groove 14 of the male coupling 10 is opposed to the groove 24 of the female coupling 20, the joint 30 (divided pieces 31) is fitted into the groove 14 of the male coupling 10 under the biasing force of the coil springs 34 until each divided piece 31 partially and tightly fitted in the groove 14 of the male coupling 10 and partially and tightly fitted in the groove 24 of the female coupling 20 (as shown in FIG. 8C), thereby preventing separation of the male and female couplings 10 and 20 in the vertical direction.

In the state shown in FIG. 8C, the countersunk head screws 41 are completely sunk into the respective through holes 42 (that is, the tops of the heads of the countersunk head screws 41 are flush with or retracted from the outer peripheral surface of the female coupling 20, while the joint 30 is fitted partially in the circumferential groove 14 and partially in the circumferential groove 24, thereby preventing relative vertical movement of the male and female couplings 10 and 20. If, however, one or more than one of the countersunk head screws 41 is not completely sunk into the corresponding through hole 42, it can be completely pushed into the through hole 42 by striking its head with e.g., a hammer. By visually confirming that all of the countersunk head screws 41 are completely sunk into the through holes 42, it is possible to confirm that the male and female couplings 10 and 20 are rigidly coupled together in the vertical direction.

Figure 2B:
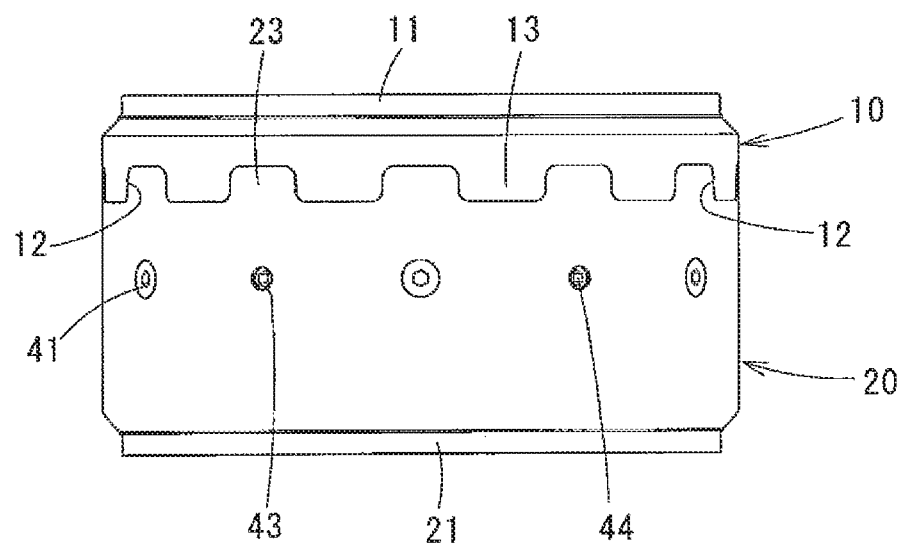
FIG. 2B is a front view of the embodiment of FIG. 1.
Figure 2C:
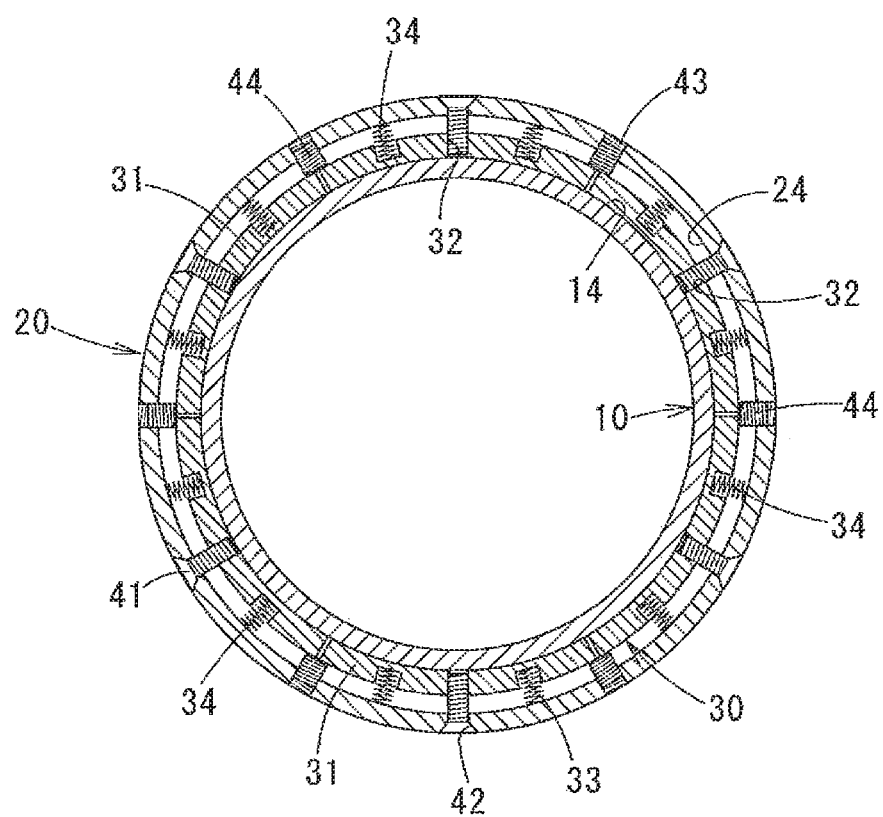
FIG. 2C is a sectional front view of the embodiment of FIG. 1.
Figure 3:
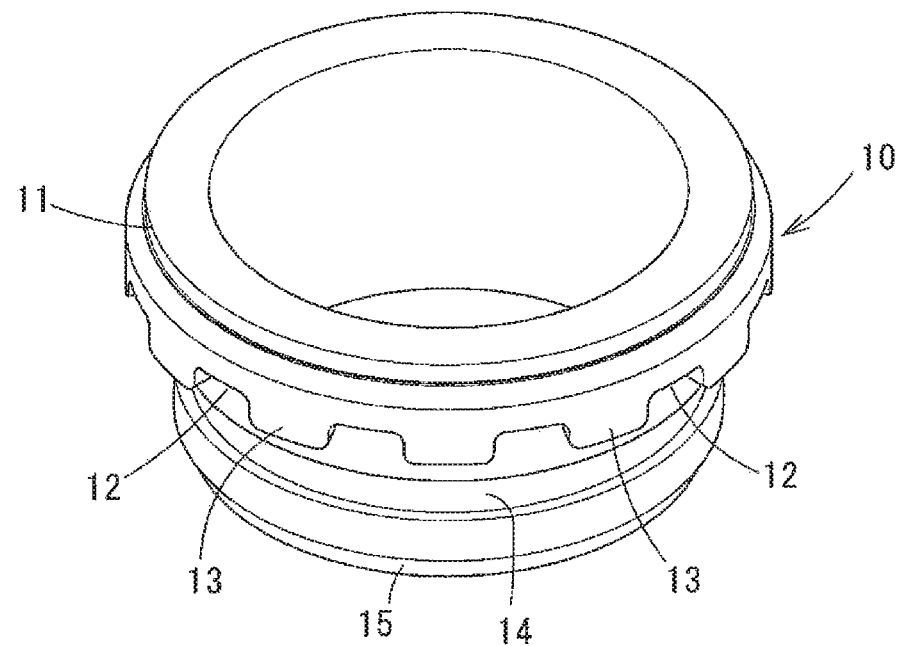
FIG. 3 is a perspective view of the embodiment of FIG. 1 where the male and female couplings are separated from each other.
Figure 3:
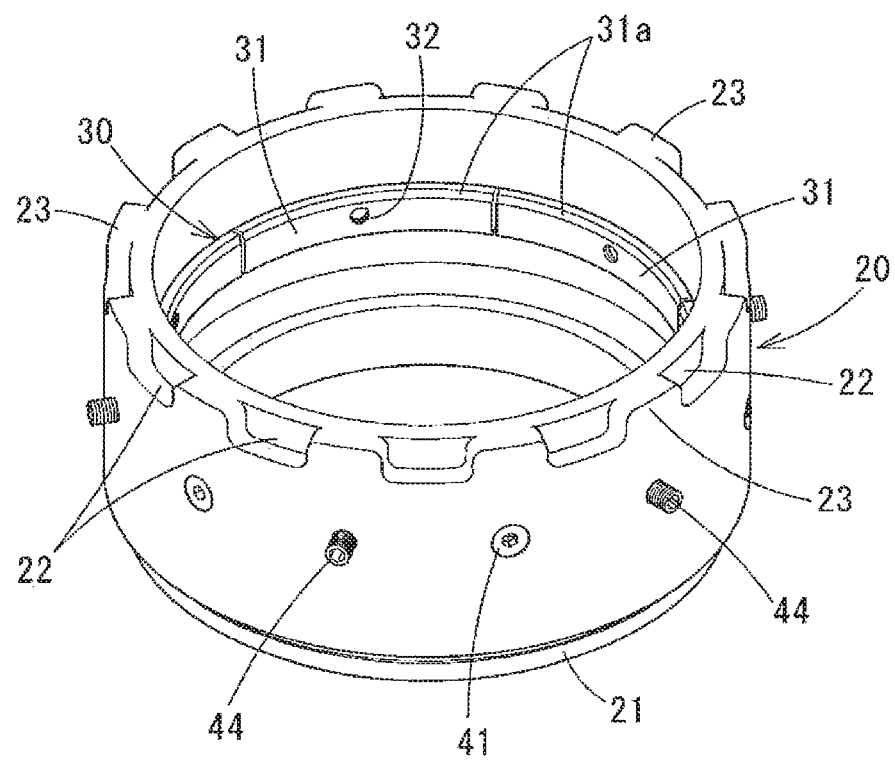

With the male and female couplings 10 and 20 coupled together, the protrusions 13 and 23 of the male and female couplings 10 and 20 are, as shown in FIGS. 2A-2C, snugly fitted in the respective recesses 22 and 12 of the female and male couplings 20 and 10.

In this state, the setscrews 44 are screwed into the respective threaded holes 43 of the female coupling 20 to press the opposed ends of the adjacent divided pieces 31, thereby pressing the divided pieces 31 against the bottom of the groove 14 of the male coupling 10, This rigidly fix the joint 30 in position in both grooves 14 and 24, thereby further rigidly couple the male and female couplings 10 and 20 together in the vertical direction.

It will be appreciated from FIG. 1 that, once the steel pipes 1a and 1b are connected together by the male and female couplings 10 and 20 in the above-described manner, the steel pipes 1a and 1b are fixedly joined together both in the rotational direction and the vertical direction (direction in which the steel pipes separate from each other). In this state, the steel pipes 1a and 1b are pressed into ground by applying a driving force to the upper steel pipe 1b. In the same manner, a required number of steel pipes 1 are connected one after another to drive (press) the steel pipe pile structure into ground by a required length.

Figure 10:
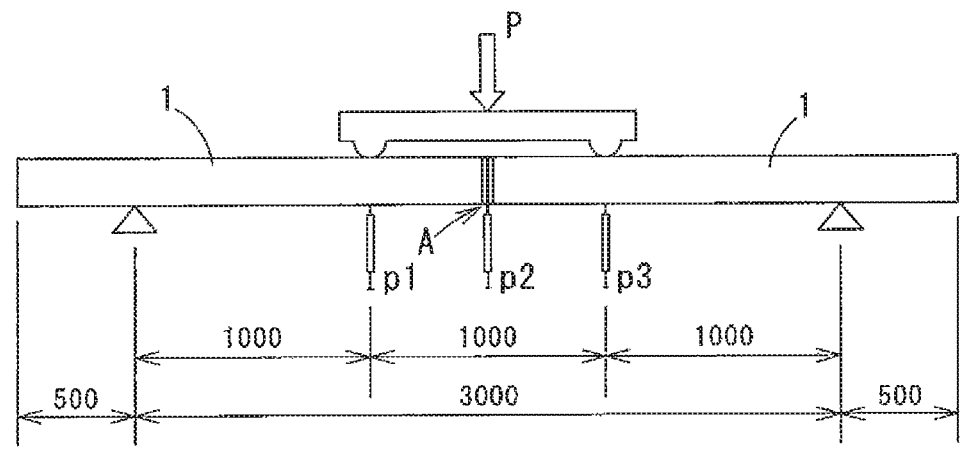
FIG. 10 illustrates a strength test.

Two steel pipes 1 having a diameter of 267.4 mm were connected together by the steel pipe coupling device A shown in FIG. 1, and this steel pipe pile structure was subjected to a simple beam bending test shown in FIG. 10, in which loads were applied at two points while supporting the pile structure at two points. The test results revealed that this pile structure sufficiently withstands the practical use. In FIG. 10, the letter "P" indicates the load, while "p1", "p2" and "p3" indicate the points where the displacement was measured. The dimensions in FIG. 10 are in millimeters.

The same test was conducted on a pile structure including steel pipes that are equal in diameter and strength to the steel pipes 1 and are connected together by the steel pipe coupling device disclosed in Patent Document 4. The test results revealed that the displacements at the respective points p1, p2 and p3 were smaller with the pile structure using the steel pipe coupling device A, when the same load P was applied to both pile structures.

These test results are considered to be due to the fact that the male and female couplings 10 and 20 of the steel pipe coupling device A of the embodiment of the present invention are rigidly coupled (connected) together due to the engagement and coupling between the protrusions 13 and 23 and the recesses 22 and 12, and due to the joint 30 rigidly fitting in the grooves 14 and 24.

In order to pull out the steel pipe pile structure driven into ground, the steel pipe coupling device A connecting each pair of steel pipes 1 is pulled out of ground by e.g., turning the pile structure in reverse; the male and female couplings 10 and 20 are made separable from each other by removing the setscrews 44, and pulling out the countersunk head screws 41 against the force of the coil springs 34 until the divided pieces 31 are retracted into the groove 24 of the female coupling 20 while being moved out of the groove 14 of the male coupling 10; and the upper steel pipe 1b is pulled away from the lower steel pipe 1a.

With the divided pieces 31 fitted in the groove 24 of the female coupling 20 around the entire circumference thereof as shown in FIG. 8A, the divided pieces 31 can be arranged in a circular annular form (as shown in FIG. 4) with the end surfaces of the adjacent divided pieces 31 abutting each other so that the divided pieces 31 do not move out of the groove 24, by using the setscrews 44 as pressing means for pressing the divided pieces 31. In this case, the coil springs 34 may be omitted, and the setscrews 44 may be positioned to press the longitudinal central portions of the divided pieces 31.

The recesses 12 and 22 and the protrusions 13 and 23 may be formed on the inner surfaces of the (tubular) male and female couplings, though torque can be more efficiently transmitted by forming such recesses and protrusions on the outer surfaces of the male and female couplings.

In the above embodiment, instead of forming a single groove 14 that extends around the entire circumference of each of the male and female couplings 10 and 20, a plurality of circumferentially spaced apart grooves may be formed on each of the male and female couplings 10 and 20. In such a case, the divided pieces 31 are sized to correspond to the plurality of circumferentially spaced apart grooves.

Figure 11A:
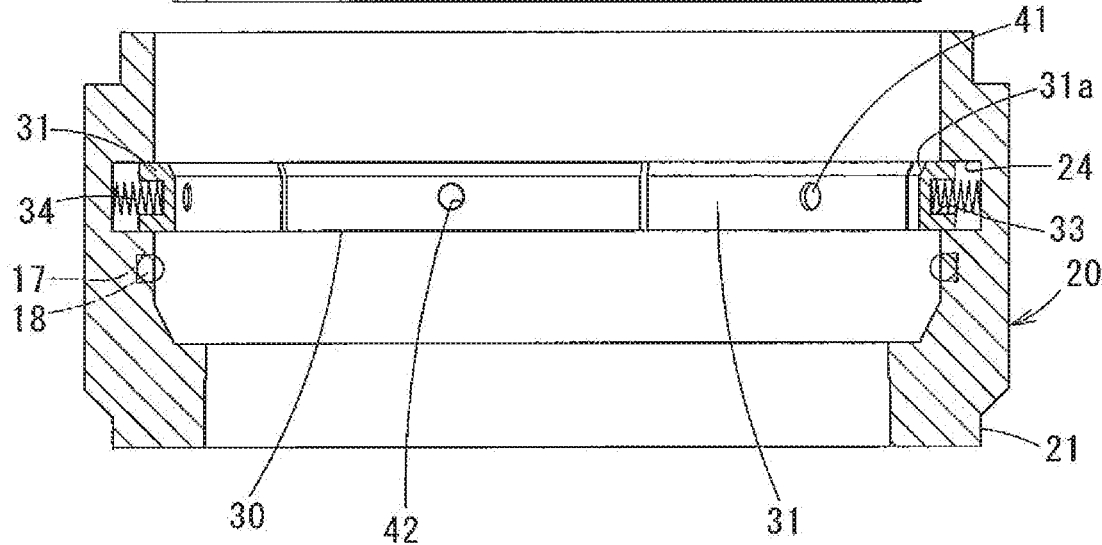
FIGS. 11A and 11B are sectional views of another embodiment, illustrating how it operates.
Figure 11B:
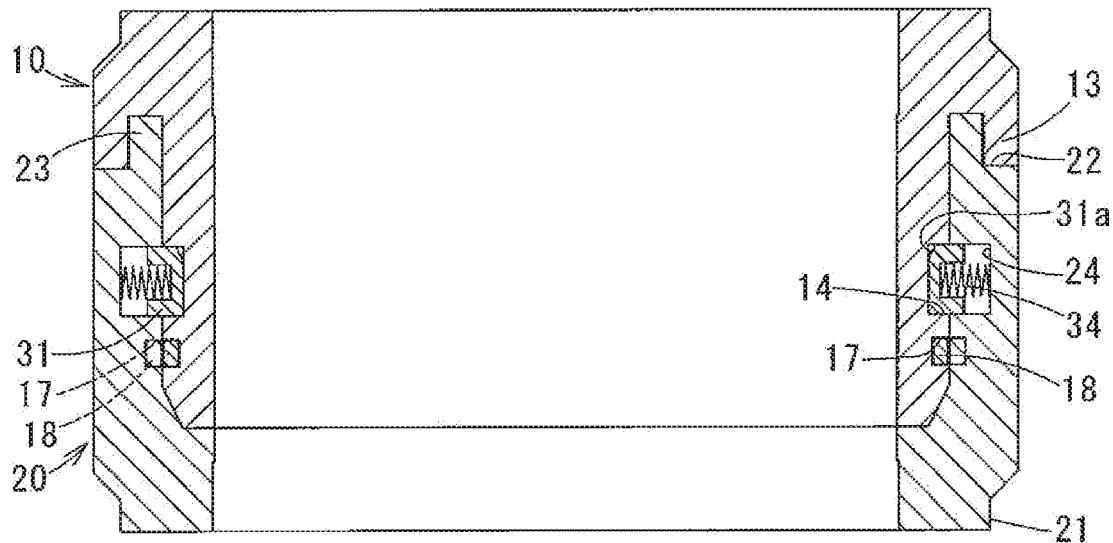

In the embodiment, as shown in FIGS. 11A and 11B, a water stop such as an O-ring 18 may be fitted in a circumferential groove 17 formed in, and extend around the entire circumference of, one of the male and female couplings 10 and 20 so as to be disposed between the male and female couplings 10 and 20, to prevent entry of water into the couplings 10 and 20. The water stop 18 may be disposed at any location where the male and female couplings 10 and 20 are fitted together, but is preferably disposed at the lower end of one of the couplings 10 and 20, as shown, more specifically, at the lower end of the male coupling 10 as shown in solid line in FIG. 11B, or at the lower end of the female coupling 20 as shown in phantom line in FIG. 11B. However, the water stop 18 is more preferably disposed at the female coupling 20 because by doing so, the divided (engaging) pieces 31 are prevented from contacting the water stop 18.

Figure 12A:
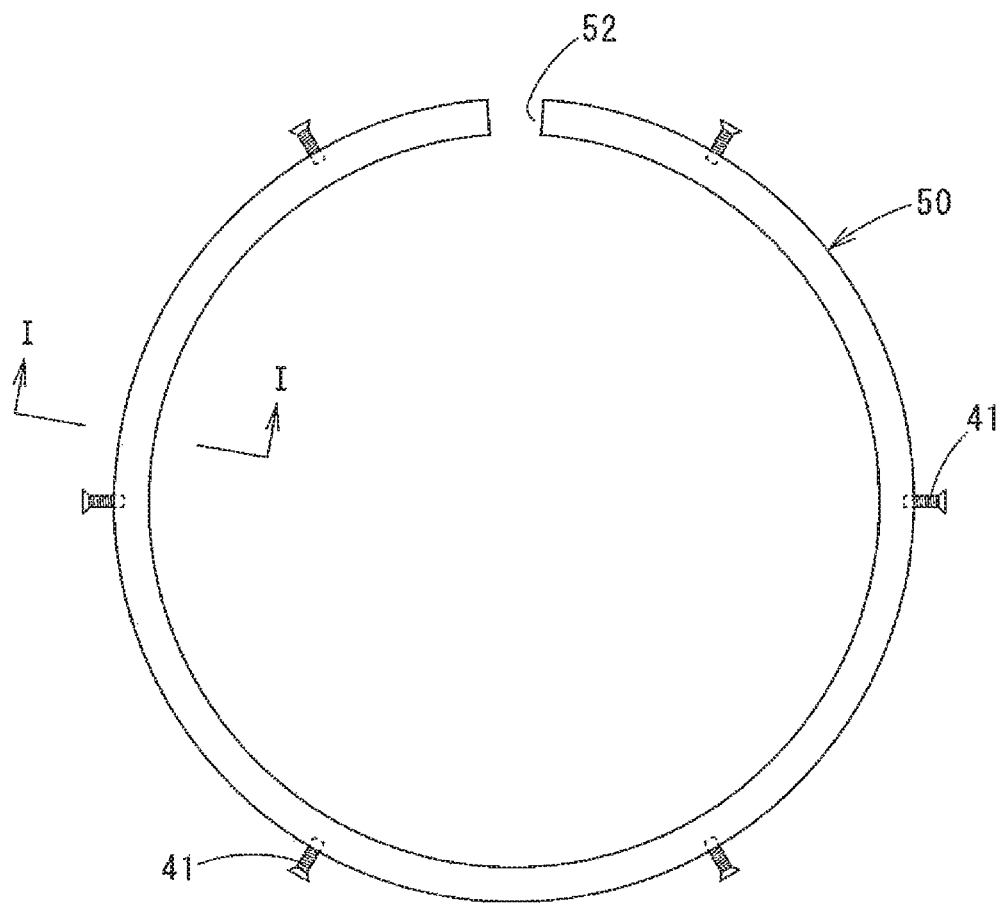
FIG. 12A is a front view of an engaging member (ring) of still another embodiment.
Figure 12B:
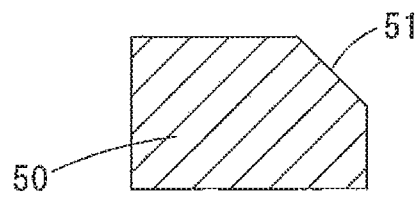
FIG. 12B is a sectional view taken along line I-I of FIG. 12A.
Figure 12C:
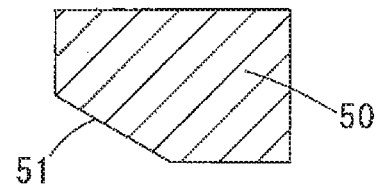
FIG. 12C is a sectional view, similar to FIG. 12B, of a modification of the engaging member of FIG. 12B.

A ring 50 shown in FIG. 12 may be used in the steel pipe coupling device A. The ring 50 has an opposed pair of circumferential ends and fitted in one of the grooves 14 and 24 so as to be fitted in both grooves 14 and 24 by being radially compressed or expanded, thereby coupling the male and female couplings 10 and 20 together. In this case, no pressing means such as springs are necessary.

Figure 13A:
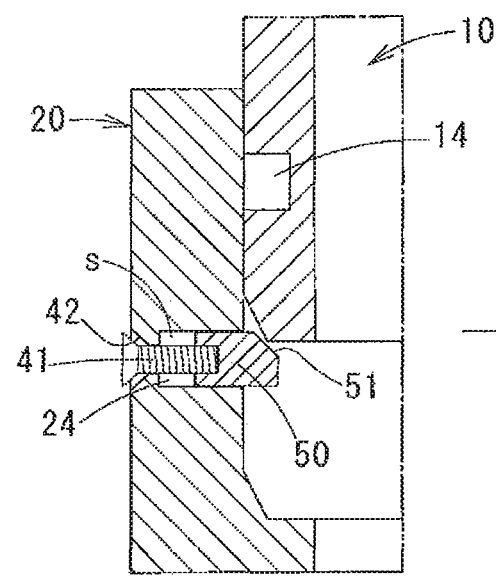
FIGS. 13A and 13B illustrate how the engaging ring shown in FIG. 12B operates.
Figure 13B:
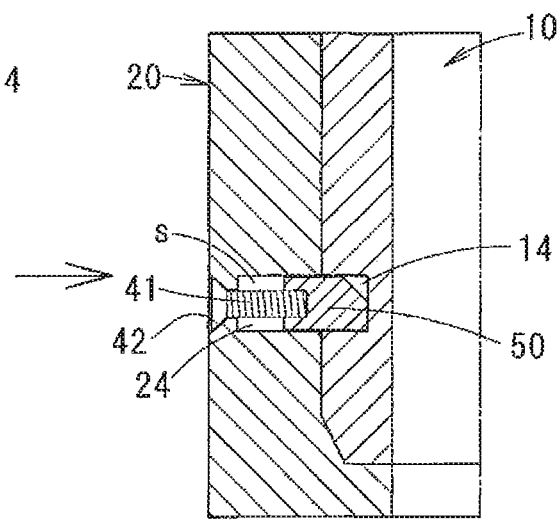
Figure 14A:
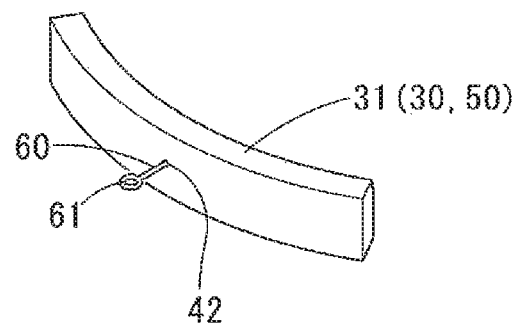
FIG. 14A is a partial perspective view of yet another embodiment.
Figure 14B:
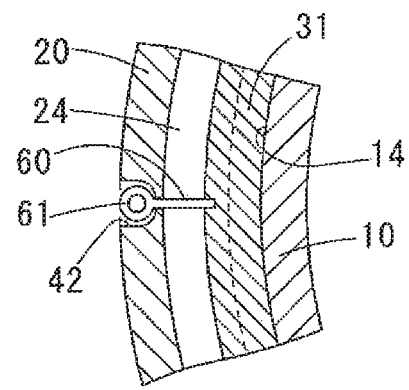
FIGS. 14B and 14C are partial sectional views of the embodiment of FIG. 14A, illustrating how it operates.
Figure 14C:
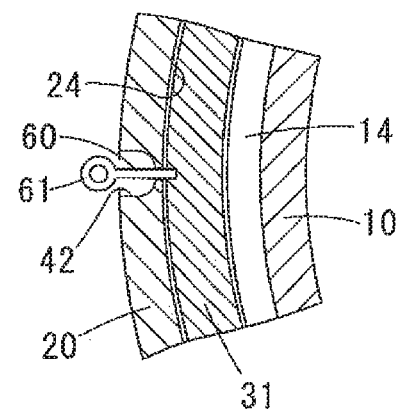

The ring 50 is a circular member defining a gap 52 between the opposed pair of circumferential ends. In the example of FIGS. 13A and 13B, the ring 50 is fitted in the groove 24 of the female coupling 20, and configured such that, as the male coupling 10 is pushed into the female coupling 20, the ring 50 is radially expanded and completely retracted into the groove 24, and as the male coupling 10 is further pushed into the female coupling 20 and the groove 14 is opposed to the groove 24, the ring 50 is radially compressed by its own elastic force until the ring 50 tightly fits into both grooves 14 and 24, thereby coupling the couplings 10 and 20 in the vertical direction. In the example of FIGS. 14B and 14C, the ring 50 is fitted in the groove 14 of the male coupling 10, and configured such that, as the male coupling 10 is pushed into the female coupling 20, the ring 50 is radially compressed and completely retracted into the groove 14, and as the male coupling 10 is further pushed into the female coupling 20 and the groove 14 is opposed to the groove 24, the ring 50 is radially expanded by its own elastic force until the ring 50 tightly fits into both grooves 14 and 24, thereby coupling the couplings 10 and 20 in the vertical direction.

In this embodiment, by visually confirming that push sticks (countersunk head screws) 41 disposed on the ring 50 are retracted into the respective through holes 42 (as shown in FIG. 13B), it is possible to confirm that the ring 50 is fitted in both of the grooves 14 and 24 of the male and female couplings 10 and 20, thereby coupling the couplings 10 and 20 together in the vertical direction. On the other hand, by pulling out the push sticks 41, the ring 50 is completely received in the circumferential groove 24 of the female coupling 20, so that the male coupling 10 can be separated from the female coupling 20.

In this embodiment, provided the male and female couplings 10 and 20 can be fixedly coupled together, the ring 50 may not be tightly fitted in the grooves 14 and 24. Elastic members such as rubber members or springs may be mounted in the space of the groove 24 defined partially by the bottom of the groove 24 and partially by the ring 50 to center and stably support the ring 50. The ring 50 may be centered by screws (push sticks 41) extending from the outer peripheral surface of the female coupling 20 to the groove 24 and arranged at equal circumferential intervals.

The push sticks may be any type of sticks, provided they can push and pull the joint 30 or the ring 50. For example, the push sticks may be, as shown in FIG. 14A-14C, pins 60 each having a circular annular engaged portion 61. The pins 60 are fixed to the joint 30 (divided engaging pieces 31) or the ring 50 e.g., by welding, by an adhesive, or by screwing. The pins 60 are configured such that, when the joint 30 or the ring 50 is fitted into both of the circumferential grooves 14 and 24, their heads, i.e., annular engaged portions 61 are, as shown in FIG. 14B, completely retracted into the through holes 42

Figure 15A:
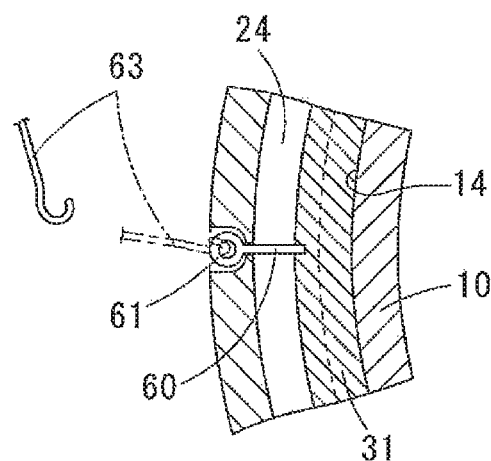
FIGS. 15A and 15B illustrate how the embodiment of FIGS. 14A-14C operates.
Figure 15B:
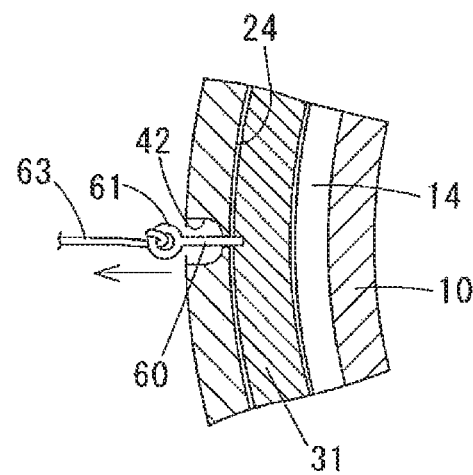
Figure 16:
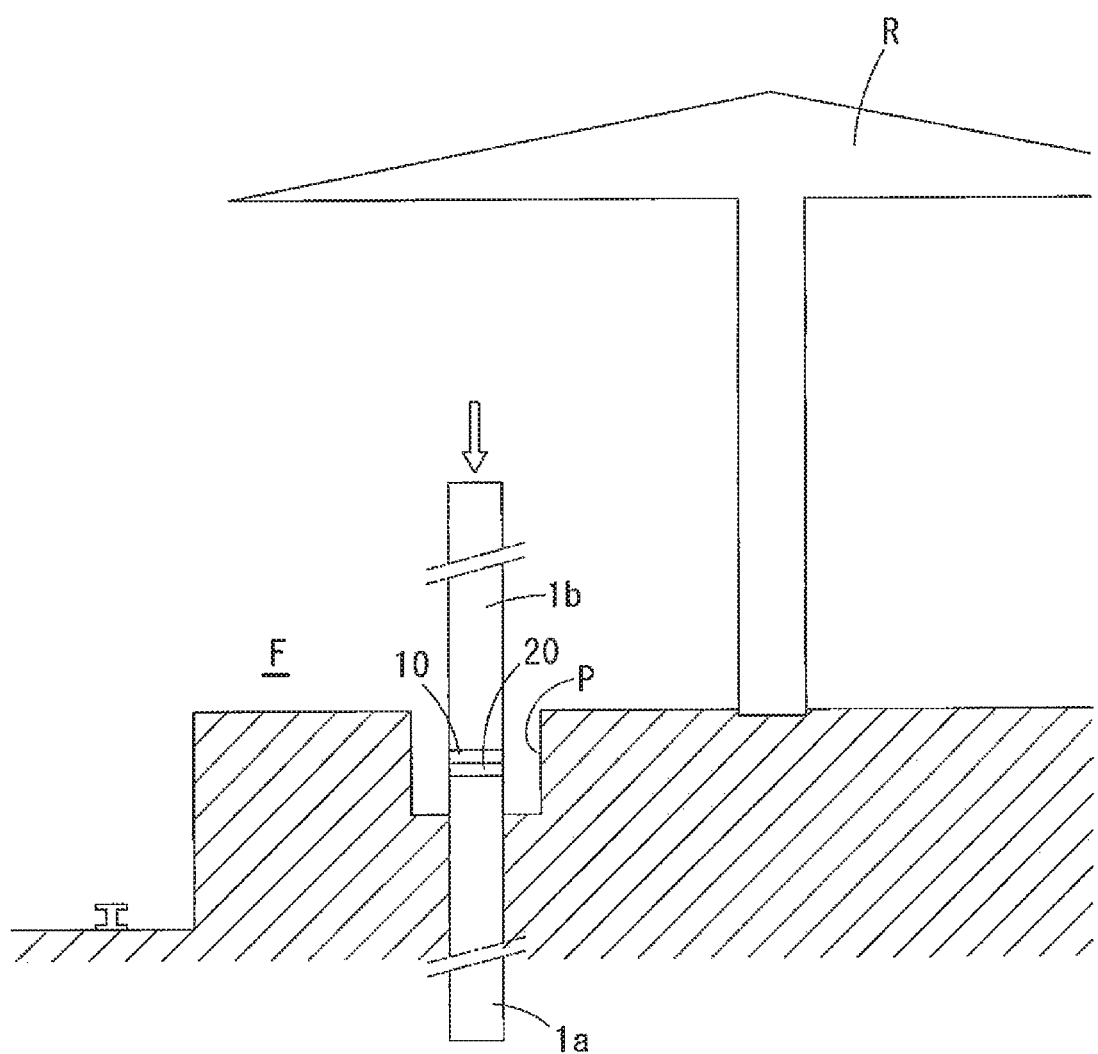
FIG. 16 shows a sectional view of a station platform, illustrating pile driving steps performed in the station platform.

As shown in FIGS. 15A and 15B, the pins (push sticks) 60 having the engaged portions 61 can be pulled by hooking their heads 61 with an extraction tool 61.

The engagement between the male and female couplings 10 and 20 may be engagement by splines. In the embodiments, the steel pipe piles are driven into ground by pressing, but the present invention is applicable to a coupling device for connecting steel pipe piles that are to be driven into ground by striking or by digging a hole.

In the embodiments, the female coupling 20 is welded to the lower (leading) steel pipe 1*a*, and the male coupling 10 is welded to the upper (trailing) steel pipe 1*b*, but instead, the female and male couplings 20 and 10 may be welded to the upper (trailing) steel pipe 1*b* and the lower (leading) steel pipes 1*a*, respectively.

The coupling device according to the present invention can be used to connect steel pipe piles together, but to connect various other steel pipes together.

The above-described embodiments represent mere examples of the present invention, and should not be interpreted as limiting the scope of the invention. Rather, the scope of the invention is defined by the accompanying claims, and the present invention covers every modification that is within the scope of the claims or which is considered to be equivalent to the claimed invention.

DESCRIPTION OF THE NUMERALS AND SYMBOLS

A. Steel pipe coupling device
1*a*. Steel pipe
1*b*. Steel pipe
10. Male coupling of the steel pipe coupling device
11. Upper edge of the male coupling
12. Recess of the male coupling
13. Protrusion of the male coupling
14. (Circumferential) groove of the male coupling
15. Lower edge of the male coupling
18. O-ring (water stop)
20. Female coupling of the steel pipe coupling device
21. Lower edge of the female coupling
22. Recess of the female coupling
23. Protrusion of the female coupling
24. (Circumferential) groove of the female coupling
30. Engaging member (joint)
31. Divided piece of the engaging member
32. Threaded hole of a divided piece
33. Spring hole of a divided piece
34. Coil spring
41. Countersunk head screw (push stick)
42. Through hole
44. Setscrew
50. Ring with an opposed pair of circumferential ends (Engaging member)
60. Pin (push stick)
61. Engaged portion of the pin
63. Extraction tool

What is claimed is:

1. A steel pipe coupling device for connecting opposed ends of two steel pipes to each other, the steel pipe coupling device comprising:
  a male coupling and a female coupling which are tubular in shape and configured to be welded to the respective steel pipes, the male and female couplings being further configured to be fitted to and mesh with each other in a direction of a common axis of the male and female couplings so as to be integrally rotatable about the common axis;
  wherein the male and female couplings have, respectively, circumferential grooves in peripheral surfaces thereof configured to be opposed to each other when the male and female couplings are fitted together such that the circumferential grooves of the male and female couplings are radially opposed to each other when the male and female couplings are fitted together;
  an engaging member configured to be fitted in both of the circumferential grooves of the male and female couplings so as to be movable radially with respect to the male and female couplings when the circumferential grooves of the male and female couplings are radially opposed to each other;
  wherein the male and female couplings are configured to be fitted to and mesh with each other with the female coupling located outside the male coupling, and the female coupling has through holes extending from an outer surface of the female coupling to the circumferential groove of the female coupling; and
  push sticks each having a distal end thereof fixed to the engaging member, and each of the push sticks extending through a respective one of the through holes such that a proximal end thereof is positioned at or adjacent to the outer surface of the female coupling while a medial portion thereof extends across the circumferential groove of the female coupling;
  wherein the male coupling is configured to be inserted into the female coupling by pulling out the push sticks until the engaging member is retracted into the circumferential groove of the female coupling, and when the male and female couplings are fitted together, the male and female couplings are configured to be coupled together so as to be inseparable in the direction of the common axis by pushing in the push sticks until the engaging member is fitted into both of the circumferential grooves of the male and female couplings, and until heads of the push sticks are completely retracted into the respective through holes; and wherein the head of each of the push sticks has an engaged portion configured to be hooked from a retracted position to an extended position by an extraction tool from outside the female coupling with the male and female couplings fitted together and meshing with each other.

2. The steel pipe coupling device of claim 1, wherein the engaging member extends around an entire circumference of the male coupling, and is circumferentially divided into divided engaging pieces;

wherein each of the through holes is located at a position corresponding to a respective one of the divided engaging pieces;

wherein the distal end of each of the push sticks is fixed to a respective one of the divided engaging pieces; and wherein the male coupling is configured to be inserted into the female coupling by pulling out the push sticks until the divided engaging pieces are retracted into the circumferential groove of the female coupling, and when the male and female couplings are fitted together, the male and female couplings are configured to be coupled together so as to be inseparable in the direction of the common axis by pushing in the push sticks until the divided engaging pieces are fitted into both of the circumferential grooves of the male and female couplings, and until the heads of the push sticks are completely retracted into the respective through holes.

3. The steel pipe coupling device of claim 2, wherein springs are disposed on both sides of a fixed portion where the distal end of each of the push sticks is fixed to one of the divided engaging pieces at equal distances from the fixed portion, and between an outer surface of the one of the divided engaging pieces and a deeper inner surface of the circumferential groove of the female coupling, the springs being configured to press the one of the divided engaging pieces toward the male coupling.

4. The steel pipe coupling device of claim 3, wherein the male coupling has a first abutment edge, and each of the divided engaging pieces has a second abutment edge configured to abut the first abutment edge, wherein at least one of the first and second abutment edges has a chamfer.

5. The steel pipe coupling device of claim 2, wherein the male coupling has a first abutment edge, and each of the divided engaging pieces has a second abutment edge configured to abut the first abutment edge, wherein at least one of the first and second abutment edges has a chamfer.

6. The steel pipe coupling device of claim 1, wherein the male coupling has a first abutment edge, and the engaging member has a second abutment edge configured to abut the first abutment edge, wherein at least one of the first and second abutment edges has a chamfer.

7. A steel pipe coupling device for connecting opposed ends of two steel pipes to each other, the steel pipe coupling device comprising:

a male coupling and a female coupling which are tubular in shape and configured to be welded to the respective steel pipes, the male and female couplings being further configured to be fitted to and mesh with each other in a direction of a common axis of the male and female couplings so as to be integrally rotatable about the common axis;

wherein the male and female couplings have, respectively, circumferential grooves in peripheral surfaces thereof configured to be opposed to each other when the male and female couplings are fitted together such that the circumferential grooves of the male and female couplings are radially opposed to each other when the male and female couplings are fitted together;

an engaging member configured to be fitted in both of the circumferential grooves of the male and female couplings so as to be movable radially with respect to the male and female couplings when the circumferential grooves of the male and female couplings are radially opposed to each other, wherein the engaging member extends around an entire circumference of the male coupling, and is circumferentially divided into divided engaging pieces;

wherein the male and female couplings are configured to be fitted to and mesh with each other with the female coupling located outside the male coupling, and the female coupling has through holes each located at a position corresponding to a respective one of the divided engaging pieces, and extending from an outer surface of the female coupling to the circumferential groove of the female coupling; and push sticks each having a distal end thereof fixed to a respective one of the divided engaging pieces, and each of the push sticks extending through a respective one of the through holes such that a proximal end thereof is positioned at or adjacent to the outer surface of the female coupling while a medial portion thereof extends across the circumferential groove of the female coupling;

wherein the male coupling is configured to be inserted into the female coupling by pulling out the push sticks until the divided engaging pieces are retracted into the circumferential groove of the female coupling, and when the male and female couplings are fitted together, the male and female couplings are configured to be coupled together so as to be inseparable in the direction of the common axis by pushing in the push sticks until the divided engaging pieces are fitted into both of the circumferential grooves of the male and female couplings, and until heads of the push sticks are completely retracted into the respective through holes; and wherein springs are disposed on both sides of a fixed portion where the distal end of each of the push sticks is fixed to one of the divided engaging pieces at equal distances from the fixed portion, and between an outer surface of the one of the divided engaging pieces and a deeper inner surface of the circumferential groove of the female coupling, the springs being configured to press the one of the divided engaging pieces toward the male coupling.

8. The steel pipe coupling device of claim 7, wherein the male coupling has a first abutment edge, and each of the divided engaging pieces has a second abutment edge configured to abut the first abutment edge, wherein at least one of the first and second abutment edges has a chamfer.

9. A steel pipe coupling device for connecting opposed ends of two steel pipes to each other, the steel pipe coupling device comprising:

a male coupling and a female coupling which are tubular in shape and configured to be welded to the respective steel pipes, the male and female couplings being further configured to be fitted to and engage each other in a direction of a common axis of the male and female couplings so as to be integrally rotatable about the common axis;

wherein the male and female couplings have, respectively, circumferential grooves in peripheral surfaces thereof configured to be opposed to each other when the male and female couplings are fitted together such that the circumferential grooves of the male and female couplings are radially opposed to each other when the male and female couplings are fitted together;

an engaging member configured to be fitted in both of the circumferential grooves of the male and female couplings so as to be movable radially with respect to the male and female couplings when the circumferential grooves of the male and female couplings are radially opposed to each other, wherein the engaging member extends around an entire circumference of the male coupling, and is circumferentially divided into divided engaging pieces;

wherein the male and female couplings are configured to be fitted to and mesh with each other with the female coupling located outside the male coupling, and the female coupling has through holes each located at a position corresponding to a respective one of the divided engaging pieces, and extending from an outer surface of the female coupling to the circumferential groove of the female coupling;

push sticks each having a distal end thereof fixed to a respective one of the divided engaging pieces, and each of the push sticks extending through a respective one of the through holes such that a proximal end thereof is positioned at or adjacent to the outer surface of the female coupling while a medial portion thereof extends across the circumferential groove of the female coupling;

wherein the male coupling is configured to be inserted into the female coupling by pulling out the push sticks until the divided engaging pieces are retracted into the circumferential groove of the female coupling, and when the male and female couplings are fitted together, the male and female couplings are configured to be coupled together so as to be inseparable in the direction of the common axis by pushing in the push sticks until the divided engaging pieces are fitted into both of the circumferential grooves of the male and female couplings, and until heads of the push sticks are completely retracted into the respective through holes; and screws configured to be screwed into the female coupling from the outer surface of the female coupling to press ends of the divided engaging pieces that define boundaries between the adjacent divided engaging pieces so as to press the divided engaging pieces against an inner surface of the circumferential groove of the male coupling.

10. The steel pipe coupling device of claim 9, wherein springs are disposed on both sides of a fixed portion where the distal end of each of the push sticks is fixed to one of the divided engaging pieces at equal distances from the fixed portion, and between an outer surface of the one of the divided engaging pieces and a deeper inner surface of the circumferential groove of the female coupling, the springs being configured to press the one of the divided engaging pieces toward the male coupling.

11. The steel pipe coupling device of claim 10, wherein the male coupling has a first abutment edge, and each of the divided engaging pieces has a second abutment edge configured to abut the first abutment edge, wherein at least one of the first and second abutment edges has a chamfer.

12. The steel pipe coupling device of claim 9, wherein the male coupling has a first abutment edge, and each of the divided engaging pieces has a second abutment edge configured to abut the first abutment edge, wherein at least one of the first and second abutment edges has a chamfer.

\* \* \* \* \*